United States Patent
Hardin et al.

(10) Patent No.: US 8,863,172 B2
(45) Date of Patent: Oct. 14, 2014

(54) EMERGENCY ALERT SYSTEM METHODS AND APPARATUS

(75) Inventors: Glen Hardin, Charlotte, NC (US); Greg Von Der Ahe, West Port, CT (US); Nubia Castillo, Charlotte, NC (US); Scott M. Davis, Tega Cay, SC (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/543,414

(22) Filed: Jul. 6, 2012

(65) Prior Publication Data

US 2013/0247094 A1    Sep. 19, 2013

Related U.S. Application Data

(60) Provisional application No. 61/612,312, filed on Mar. 17, 2012.

(51) Int. Cl.
*H04N 7/025* (2006.01)
*H04N 21/81* (2011.01)
*H04N 21/488* (2011.01)

(52) U.S. Cl.
USPC .............................. 725/33; 725/32

(58) Field of Classification Search
None
See application file for complete search history.

(56) References Cited

U.S. PATENT DOCUMENTS

| 7,681,215 | B2 * | 3/2010 | Kim | 725/33 |
|---|---|---|---|---|
| 2007/0136304 | A1 * | 6/2007 | Stone et al. | 707/10 |
| 2007/0199016 | A1 * | 8/2007 | Yun et al. | 725/33 |
| 2008/0120639 | A1 * | 5/2008 | Walter et al. | 725/33 |
| 2010/0088718 | A1 * | 4/2010 | Hasek et al. | 725/33 |
| 2010/0146541 | A1 * | 6/2010 | Velazquez | 725/33 |
| 2012/0102522 | A1 * | 4/2012 | Long et al. | 725/33 |
| 2012/0185897 | A1 * | 7/2012 | Gould et al. | 725/33 |

* cited by examiner

*Primary Examiner* — Hunter B Lonsberry
*Assistant Examiner* — Cynthia Fogg
(74) *Attorney, Agent, or Firm* — Straub & Pokotylo; Michael P. Straub; Stephen T. Straub

(57) ABSTRACT

Methods and apparatus for delivering emergency alert system message content to customer premise devices without requiring them to tune to an emergency message channel and having to encode information into frames of regular program content being delivered to customer premise devices, e.g., set top boxes, are described. An emergency management server receives emergency alert messages from a federal government system and generates emergency alert control messages which are sent to one or more switching devices located at one or more regional hubsites/headends to which the emergency alert message applies. The emergency alert control message instructs the switching device to output an emergency alert content stream in place of a standard program. The switching device outputs the emergency content message stream in place of the standard program content to, e.g., a QAM modulator, which modulates the content stream on the frequency being used to deliver the standard program content being replaced.

20 Claims, 14 Drawing Sheets

| | EAS Definition | Multicast Source IP Address | Multicast Source Port Address | Stream Number |
|---|---|---|---|---|
| 1 | Do Not Switch On EAS Alert | n/a | n/a | 0 |
| 2 | Encoded EAS Program Stream | XXX.XXX.XXX.XXX | YYYY | 1 |
| 3 | Encoded EAS Audio Stream for Music Choice | XXX.XXX.XXX.XXX | YYYY | 2 |
| 4 | Encoded Maintenance Slate | XXX.XXX.XXX.XXX | YYYY | 3 |

FIG. 8

| | FEDERAL INFORMATION PROCESSING STANDARD (FIPS CODE AREA) | CORRESPONDING QAM MODULATORS |
|---|---|---|
| 1 | 01001,AUTAUGA,ALABAMA | MOD 1, MOD 4 |
| 2 | 01031,COFEE,ALABAMA | MOD 2, MOD 3, MOD 5 |
| 3 | 01061,GENEVA,ALABAMA | MOD 1, MOD 4 |
| 4 | 01059,FRANKLIN,ALABAMA | MOD 2, MOD 5 |
| 5 | FIPS,COUNTY,STATE | MOD A, MOD B |
| ⋮ | ⋮ | ⋮ |
| N | FIPS,COUNTY,STATE | MOD X, MOD Y |

FIG. 9

| 1000 | 1002 | 1004 | 1006 | 1008 | 1010 | 1012 |
|---|---|---|---|---|---|---|
| | | Description | QAMs Control IP Address | Multicast Source IP Address | Multicast Source Port Address | Switch On EAS Alert |
| | 1 | ABC HD | XXX.XXX.XXX.XXX | XXX.XXX.XXX.XXX | YYYY | 0 |
| | 2 | CBS HD | XXX.XXX.XXX.XXX | XXX.XXX.XXX.XXX | YYYY | 0 |
| | 3 | CW HD | XXX.XXX.XXX.XXX | XXX.XXX.XXX.XXX | YYYY | 0 |
| | 4 | FOX HD | XXX.XXX.XXX.XXX | XXX.XXX.XXX.XXX | YYYY | 0 |
| | 5 | NBC HD | XXX.XXX.XXX.XXX | XXX.XXX.XXX.XXX | YYYY | 0 |
| | 6 | PBS HD | XXX.XXX.XXX.XXX | XXX.XXX.XXX.XXX | YYYY | 0 |
| | 7 | Univision/Telefutura HD | XXX.XXX.XXX.XXX | XXX.XXX.XXX.XXX | YYYY | 1 |
| | 8 | Telemundo HD | XXX.XXX.XXX.XXX | XXX.XXX.XXX.XXX | YYYY | 1 |
| | 9 | C-SPAN SD | XXX.XXX.XXX.XXX | XXX.XXX.XXX.XXX | YYYY | 1 |
| | 10 | A&E HD | XXX.XXX.XXX.XXX | XXX.XXX.XXX.XXX | YYYY | 1 |
| | 11 | ABC Family HD | XXX.XXX.XXX.XXX | XXX.XXX.XXX.XXX | YYYY | 1 |
| | 12 | AMC HD | XXX.XXX.XXX.XXX | XXX.XXX.XXX.XXX | YYYY | 1 |
| | 13 | Animal Planet HD | XXX.XXX.XXX.XXX | XXX.XXX.XXX.XXX | YYYY | 1 |
| | 14 | BBC America HD | XXX.XXX.XXX.XXX | XXX.XXX.XXX.XXX | YYYY | 1 |
| | 15 | BET HD | XXX.XXX.XXX.XXX | XXX.XXX.XXX.XXX | YYYY | 1 |
| | 16 | Bloomberg - SD | XXX.XXX.XXX.XXX | XXX.XXX.XXX.XXX | YYYY | 1 |
| | 17 | Bravo HD | XXX.XXX.XXX.XXX | XXX.XXX.XXX.XXX | YYYY | 1 |
| | 18 | Cartoon Network HD | XXX.XXX.XXX.XXX | XXX.XXX.XXX.XXX | YYYY | 1 |
| | 19 | CNBC HD | XXX.XXX.XXX.XXX | XXX.XXX.XXX.XXX | YYYY | 1 |
| | 20 | CNN HD | XXX.XXX.XXX.XXX | XXX.XXX.XXX.XXX | YYYY | 1 |
| | 21 | Comedy Central HD | XXX.XXX.XXX.XXX | XXX.XXX.XXX.XXX | YYYY | 1 |
| | 22 | Discovery HD | XXX.XXX.XXX.XXX | XXX.XXX.XXX.XXX | YYYY | 1 |
| | 23 | Disney Channel HD | XXX.XXX.XXX.XXX | XXX.XXX.XXX.XXX | YYYY | 1 |
| | 24 | E! HD | XXX.XXX.XXX.XXX | XXX.XXX.XXX.XXX | YYYY | 1 |
| | 25 | ESPN HD | XXX.XXX.XXX.XXX | XXX.XXX.XXX.XXX | YYYY | 1 |
| | 26 | ESPN2 HD | XXX.XXX.XXX.XXX | XXX.XXX.XXX.XXX | YYYY | 1 |
| | 27 | ESPN Classic - SD | XXX.XXX.XXX.XXX | XXX.XXX.XXX.XXX | YYYY | 1 |
| | 28 | ESPNEWS HD | XXX.XXX.XXX.XXX | XXX.XXX.XXX.XXX | YYYY | 1 |
| | 29 | ESPN U HD | XXX.XXX.XXX.XXX | XXX.XXX.XXX.XXX | YYYY | 1 |
| | 30 | Food Network HD | XXX.XXX.XXX.XXX | XXX.XXX.XXX.XXX | YYYY | 1 |
| | 31 | Fox News HD | XXX.XXX.XXX.XXX | XXX.XXX.XXX.XXX | YYYY | 1 |
| | 32 | FSN HD (Varies) | XXX.XXX.XXX.XXX | XXX.XXX.XXX.XXX | YYYY | 1 |
| | 33 | FX HD | XXX.XXX.XXX.XXX | XXX.XXX.XXX.XXX | YYYY | 1 |
| | 34 | Golf Channel HD | XXX.XXX.XXX.XXX | XXX.XXX.XXX.XXX | YYYY | 1 |
| | 35 | Headline News HD | XXX.XXX.XXX.XXX | XXX.XXX.XXX.XXX | YYYY | 1 |
| | 36 | HGTV HD | XXX.XXX.XXX.XXX | XXX.XXX.XXX.XXX | YYYY | 1 |
| | 37 | History Channel HD | XXX.XXX.XXX.XXX | XXX.XXX.XXX.XXX | YYYY | 1 |
| | 38 | Lifetime | XXX.XXX.XXX.XXX | XXX.XXX.XXX.XXX | YYYY | 1 |
| | 39 | MSNBC HD | XXX.XXX.XXX.XXX | XXX.XXX.XXX.XXX | YYYY | 1 |
| | 40 | MTV HD | XXX.XXX.XXX.XXX | XXX.XXX.XXX.XXX | YYYY | 1 |
| | 41 | Nat Geographic HD | XXX.XXX.XXX.XXX | XXX.XXX.XXX.XXX | YYYY | 1 |
| | 42 | Nickelodeon | XXX.XXX.XXX.XXX | XXX.XXX.XXX.XXX | YYYY | 1 |
| | 43 | Science HD | XXX.XXX.XXX.XXX | XXX.XXX.XXX.XXX | YYYY | 1 |

FIG. 10A

| FIG. 10A |
|---|
| FIG. 10B |
| FIG. 10C |

FIG. 10

| | | | | | |
|---|---|---|---|---|---|
| 44 | Speed HD | XXX.XXX.XXX.XXX | XXX.XXX.XXX.XXX | YYYY | 1 |
| 45 | SyFy HD | XXX.XXX.XXX.XXX | XXX.XXX.XXX.XXX | YYYY | 1 |
| 46 | TBS HD | XXX.XXX.XXX.XXX | XXX.XXX.XXX.XXX | YYYY | 1 |
| 47 | TLC HD | XXX.XXX.XXX.XXX | XXX.XXX.XXX.XXX | YYYY | 1 |
| 48 | TNT HD | XXX.XXX.XXX.XXX | XXX.XXX.XXX.XXX | YYYY | 1 |
| 49 | Travel HD | XXX.XXX.XXX.XXX | XXX.XXX.XXX.XXX | YYYY | 1 |
| 50 | USA HD | XXX.XXX.XXX.XXX | XXX.XXX.XXX.XXX | YYYY | 1 |
| 51 | Versus HD | XXX.XXX.XXX.XXX | XXX.XXX.XXX.XXX | YYYY | 1 |
| 52 | Weather Channel HD | XXX.XXX.XXX.XXX | XXX.XXX.XXX.XXX | YYYY | 1 |
| 53 | HD Channel 1 - Open | XXX.XXX.XXX.XXX | XXX.XXX.XXX.XXX | YYYY | 1 |
| 54 | HD Channel 2 - Open | XXX.XXX.XXX.XXX | XXX.XXX.XXX.XXX | YYYY | 1 |
| 55 | HD Channel 3 - Open | XXX.XXX.XXX.XXX | XXX.XXX.XXX.XXX | YYYY | 1 |
| 56 | HD Channel 4 - Open | XXX.XXX.XXX.XXX | XXX.XXX.XXX.XXX | YYYY | 1 |
| | Premium | | | | |
| 57 | HBO HD | XXX.XXX.XXX.XXX | XXX.XXX.XXX.XXX | YYYY | 1 |
| 58 | HBO 2 HD | XXX.XXX.XXX.XXX | XXX.XXX.XXX.XXX | YYYY | 1 |
| 59 | Showtime HD | XXX.XXX.XXX.XXX | XXX.XXX.XXX.XXX | YYYY | 1 |
| 60 | Showtime 2 HD | XXX.XXX.XXX.XXX | XXX.XXX.XXX.XXX | YYYY | 1 |
| | | | | | |
| | Music Choice | | | | |
| 1 | Hit List | XXX.XXX.XXX.XXX | XXX.XXX.XXX.XXX | YYYY | 2 |
| 2 | Hip-Hop and R&B | XXX.XXX.XXX.XXX | XXX.XXX.XXX.XXX | YYYY | 2 |
| 3 | MC Mix Tape | XXX.XXX.XXX.XXX | XXX.XXX.XXX.XXX | YYYY | 2 |
| 4 | Dance/Electronica | XXX.XXX.XXX.XXX | XXX.XXX.XXX.XXX | YYYY | 2 |
| 5 | Rap | XXX.XXX.XXX.XXX | XXX.XXX.XXX.XXX | YYYY | 2 |
| 6 | Hip-Hop Classics | XXX.XXX.XXX.XXX | XXX.XXX.XXX.XXX | YYYY | 2 |
| 7 | Throwback Jamz | XXX.XXX.XXX.XXX | XXX.XXX.XXX.XXX | YYYY | 2 |
| 8 | R&B Classics | XXX.XXX.XXX.XXX | XXX.XXX.XXX.XXX | YYYY | 2 |
| 9 | R&B Soul | XXX.XXX.XXX.XXX | XXX.XXX.XXX.XXX | YYYY | 2 |
| 10 | Gospel | XXX.XXX.XXX.XXX | XXX.XXX.XXX.XXX | YYYY | 2 |
| 11 | Reggae | XXX.XXX.XXX.XXX | XXX.XXX.XXX.XXX | YYYY | 2 |
| 12 | Classic Rock | XXX.XXX.XXX.XXX | XXX.XXX.XXX.XXX | YYYY | 2 |
| 13 | Retro Rock | XXX.XXX.XXX.XXX | XXX.XXX.XXX.XXX | YYYY | 2 |
| 14 | Rock | XXX.XXX.XXX.XXX | XXX.XXX.XXX.XXX | YYYY | 2 |
| 15 | Metal | XXX.XXX.XXX.XXX | XXX.XXX.XXX.XXX | YYYY | 2 |
| 16 | Alternative | XXX.XXX.XXX.XXX | XXX.XXX.XXX.XXX | YYYY | 2 |
| 17 | Classic Alternative | XXX.XXX.XXX.XXX | XXX.XXX.XXX.XXX | YYYY | 2 |
| 18 | Adult Alternative | XXX.XXX.XXX.XXX | XXX.XXX.XXX.XXX | YYYY | 2 |
| 19 | Soft Rock | XXX.XXX.XXX.XXX | XXX.XXX.XXX.XXX | YYYY | 2 |
| 20 | Pop Hits | XXX.XXX.XXX.XXX | XXX.XXX.XXX.XXX | YYYY | 2 |
| 21 | 90's | XXX.XXX.XXX.XXX | XXX.XXX.XXX.XXX | YYYY | 2 |
| 22 | 80's | XXX.XXX.XXX.XXX | XXX.XXX.XXX.XXX | YYYY | 2 |
| 23 | 70's | XXX.XXX.XXX.XXX | XXX.XXX.XXX.XXX | YYYY | 2 |
| 24 | Solid Gold Oldies | XXX.XXX.XXX.XXX | XXX.XXX.XXX.XXX | YYYY | 2 |
| 25 | Party Favorites | XXX.XXX.XXX.XXX | XXX.XXX.XXX.XXX | YYYY | 2 |
| 26 | Stage & Screen | XXX.XXX.XXX.XXX | XXX.XXX.XXX.XXX | YYYY | 2 |
| 27 | Kidz Only | XXX.XXX.XXX.XXX | XXX.XXX.XXX.XXX | YYYY | 2 |
| 28 | Toddler Tunes | XXX.XXX.XXX.XXX | XXX.XXX.XXX.XXX | YYYY | 2 |

FIG. 10B

| 29 | Today's Country | XXX.XXX.XXX.XXX | XXX.XXX.XXX.XXX | YYYY | 2 |
|---|---|---|---|---|---|
| 30 | True Country | XXX.XXX.XXX.XXX | XXX.XXX.XXX.XXX | YYYY | 2 |
| 31 | Classic Country | XXX.XXX.XXX.XXX | XXX.XXX.XXX.XXX | YYYY | 2 |
| 32 | Contemporary Christian | XXX.XXX.XXX.XXX | XXX.XXX.XXX.XXX | YYYY | 2 |
| 33 | Sounds of the Season | XXX.XXX.XXX.XXX | XXX.XXX.XXX.XXX | YYYY | 2 |
| 34 | Soundscapes | XXX.XXX.XXX.XXX | XXX.XXX.XXX.XXX | YYYY | 2 |
| 35 | Smooth Jazz | XXX.XXX.XXX.XXX | XXX.XXX.XXX.XXX | YYYY | 2 |
| 36 | Jazz | XXX.XXX.XXX.XXX | XXX.XXX.XXX.XXX | YYYY | 2 |
| 37 | Blues | XXX.XXX.XXX.XXX | XXX.XXX.XXX.XXX | YYYY | 2 |
| 38 | Singers & Swing | XXX.XXX.XXX.XXX | XXX.XXX.XXX.XXX | YYYY | 2 |
| 39 | Easy Listening | XXX.XXX.XXX.XXX | XXX.XXX.XXX.XXX | YYYY | 2 |
| 40 | Classical Masterpieces | XXX.XXX.XXX.XXX | XXX.XXX.XXX.XXX | YYYY | 2 |
| 41 | Light Classical | XXX.XXX.XXX.XXX | XXX.XXX.XXX.XXX | YYYY | 2 |
| 42 | Musica Urbana | XXX.XXX.XXX.XXX | XXX.XXX.XXX.XXX | YYYY | 2 |
| 43 | Pop Latino | XXX.XXX.XXX.XXX | XXX.XXX.XXX.XXX | YYYY | 2 |
| 44 | Tropicales | XXX.XXX.XXX.XXX | XXX.XXX.XXX.XXX | YYYY | 2 |
| 45 | Mexicana | XXX.XXX.XXX.XXX | XXX.XXX.XXX.XXX | YYYY | 2 |

FIG. 10C

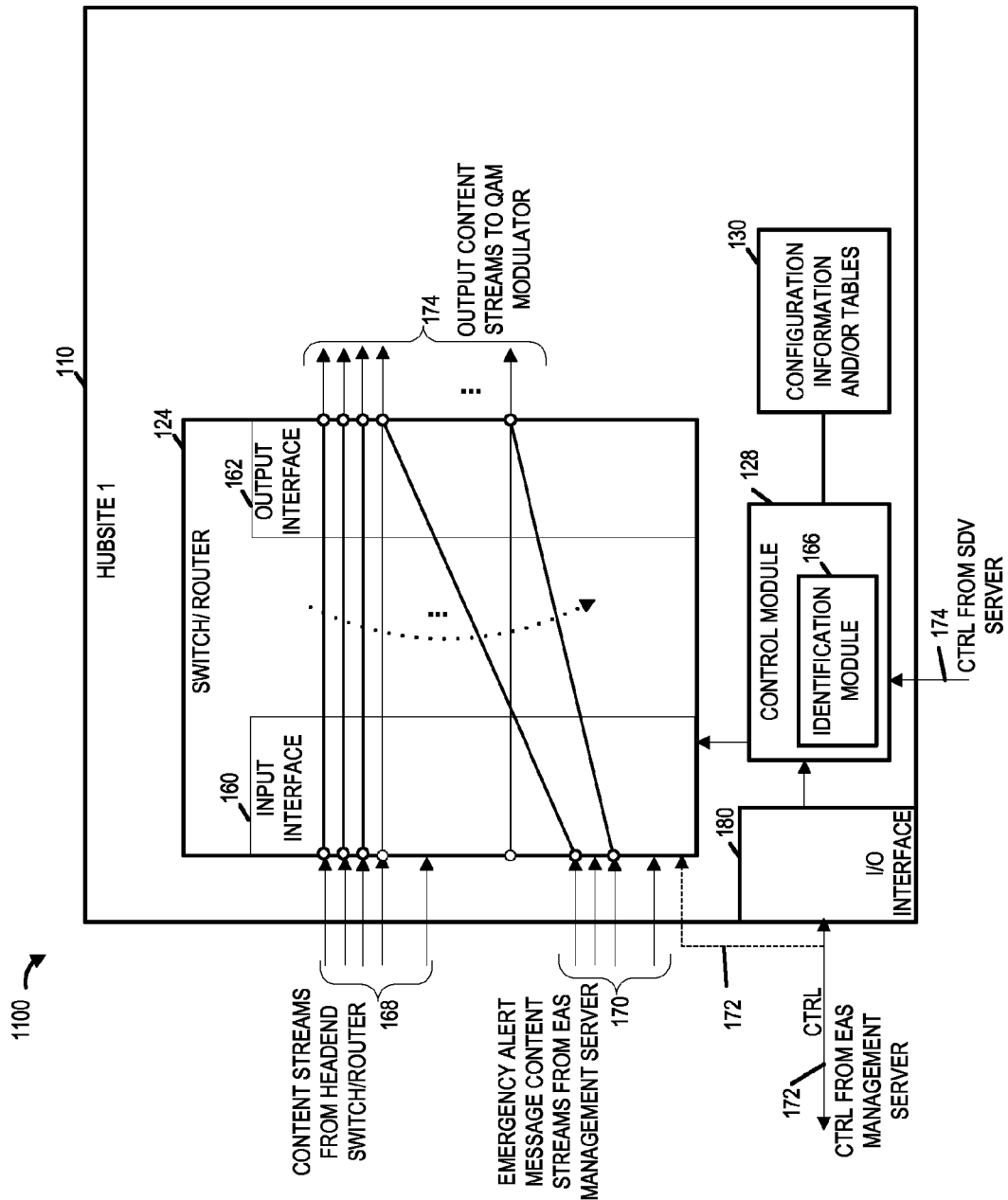

EMERGENCY ALERT SYSTEM METHODS AND APPARATUS

RELATED APPLICATIONS

The present application claims the benefit of U.S. Provisional Patent Application Ser. No. 61/612,312 filed Mar. 17, 2012, entitled "EMERGENCY ALERT SYSTEM METHODS AND APPARATUS", which is hereby expressly incorporated by reference in its entirety.

FIELD OF INVENTION

The invention relates to methods and apparatus for providing emergency alert system messages and, more particularly, to methods and apparatus for providing emergency alert system messages without having to decode and/or re-encode normal content streams.

BACKGROUND

For a variety of reasons, including legal requirements in the United States, system operators of systems which provide content to subscribers, such as cable and television system operations, are required to include the capability of delivering emergency alert messages over one or more channels, e.g., television channels, in response to one or more emergency alert messages (EAS). EAS alert capabilities are often required to include, in addition to the ability to provide an audio and/or video alert when required, support for EAS zones, e.g., corresponding to different geographic regions.

Various approaches have been taken to support EAS requirements. For example, some system operations have included support for EAS banner overlay where a banner including an EAS message may be overlayed over a portion of video content which is being delivered. Banner insertion into a content stream which is being delivered can be processor intensive and may involve decoding and re-encoding video content being delivered so that the banner is incorporated as part of the individual video frames being delivered and/or so that the end devices overlay a banner with the EAS message over the video content being delivered.

The addition of servers used to insert EAS banners by merging frame content in a stream which is being delivered with EAS banner content can be expensive given the complexity of the video content merging process on a per frame basis, e.g., in the real time period corresponding to an EAS message.

The use of servers to perform banner merging with video frames is not only costly, but it does not scale well in the context of multiple zones where different content streams may be delivered to different zones requiring a large number of servers to enable the real time merging of EAS banners with individual frames on a per zone basis.

Other approaches to EAS messaging which have been used with some success include what is sometime referred to as "force tuning" set top boxes to EAS channels. This approach normally involves sending signals to set top boxes which control the set top box causing it to tune to a channel, e.g., frequency band, used to broadcast an EAS message. At the end of the EAS message, the individual set top boxes are sent another instruction, e.g., from a network headend, to tune back to the channel they were previously tuned to.

As should be appreciated, the "force tune" approach has the disadvantage of requiring tuning commands to be provided to set top boxes, the tuning to the EAS message channel and then the retuning back to the channel previously being viewed. Not only does this require a fair number of commands to be sent and processed, but it also involves delays in that the messaging to the set top boxes and the retuning all involve some amount of time. In the case of emergency alert messages relating to tornados and/or other critical events, delays of even a few seconds may make a difference in the usefulness of the emergency alert message.

In view of the above discussion, it should be appreciated that there is a need for improved methods and/or apparatus for providing emergency alert messages. In particular, it would be desirable if methods and/or apparatus could be developed which would allow emergency alert messages to be supplied to set top boxes without having to force tune set top boxes to an EAS message channel and/or without having to merge an alert message with the content of individual video frames.

SUMMARY

Methods and apparatus for delivering emergency alert system message content to customer premise devices without requiring the customer premise devices to re-tune to an emergency message channel and without having to encode information into frames of regular program content being delivered to customer premise devices, e.g., set top boxes, is described.

An emergency management server implemented in accordance with the invention receives emergency alert messages from a federal government and/or other system and generates emergency alert control messages which are sent to one or more switching devices, e.g., switches and/or routers located at one or more regional hubsites or headend sites to which the received emergency alert message applies. The emergency alert control message instructs the switching device to output an emergency alert message content stream in place of a standard program, e.g., channel, content stream. A map of the standard content stream to be replaced and the corresponding emergency message content stream with which it is to be replaced is provided to the switching device. Additionally, the emergency message content stream that is to replace the standard content stream is also provided to the switching device. The switching device outputs the emergency content message stream in place of the standard program content stream to, e.g., a QAM modulator which modulates the content stream using QAM modulation on the frequency being used to deliver the standard program channel content which is being replaced. Since the emergency management content is delivered using the same frequency and modulation technique which was previously being used to deliver the program content being replaced by the emergency message content, the customer premise devices do not have to tune to a different frequency than the one they were already receiving to receive the emergency message content.

At the end of an emergency alert, the emergency alert management server instructs the switching devices which were instructed to switch to outputting the emergency management message content to outputting the normal program content. The emergency message content may be generated by the emergency management server which generates the emergency management control messages used to control the switching devices, e.g., from the received emergency alert message or messages which trigger the generation of the control messages. Alternatively the emergency alert content streams may be generated from another server or system and supplied to the switching devices there from.

Numerous additional features and embodiments are discussed in the detailed description which follows.

BRIEF DESCRIPTION OF THE DRAWINGS

FIG. 8 illustrates an exemplary emergency alert message content source stream number configuration map in the form of a table in accordance with one embodiment of the present invention.

FIG. 9 illustrates an exemplary EAS Zone configuration hubsite map that maps the Federal Information Processing Standard (FIPS Code Area) to the corresponding QAM modulators supporting the identified area in accordance with one embodiment of the present invention.

FIG. 10, which comprises the combination of FIGS. 10A, 10B, and 10C, illustrates an exemplary channel/programming configuration table for a hubsite that maps a channel to corresponding EAS source stream number/identifier of the emergency alert message content source stream number that will replace the channel upon an EAS Alert in accordance with one embodiment of the present invention.

FIG. 11 illustrates a portion of the system of FIG. 1 including a hubsite and various elements therein in greater detail.

DETAILED DESCRIPTION

Methods and apparatus of the present invention allow for Emergency Alert System (EAS) messages to be delivered to customer premise devices without requiring the force tuning of customer premise devices, e.g., set top boxes, to an EAS message channel.

Various exemplary embodiments of the present invention will now be discussed with reference to the Figures.

Figure 1:
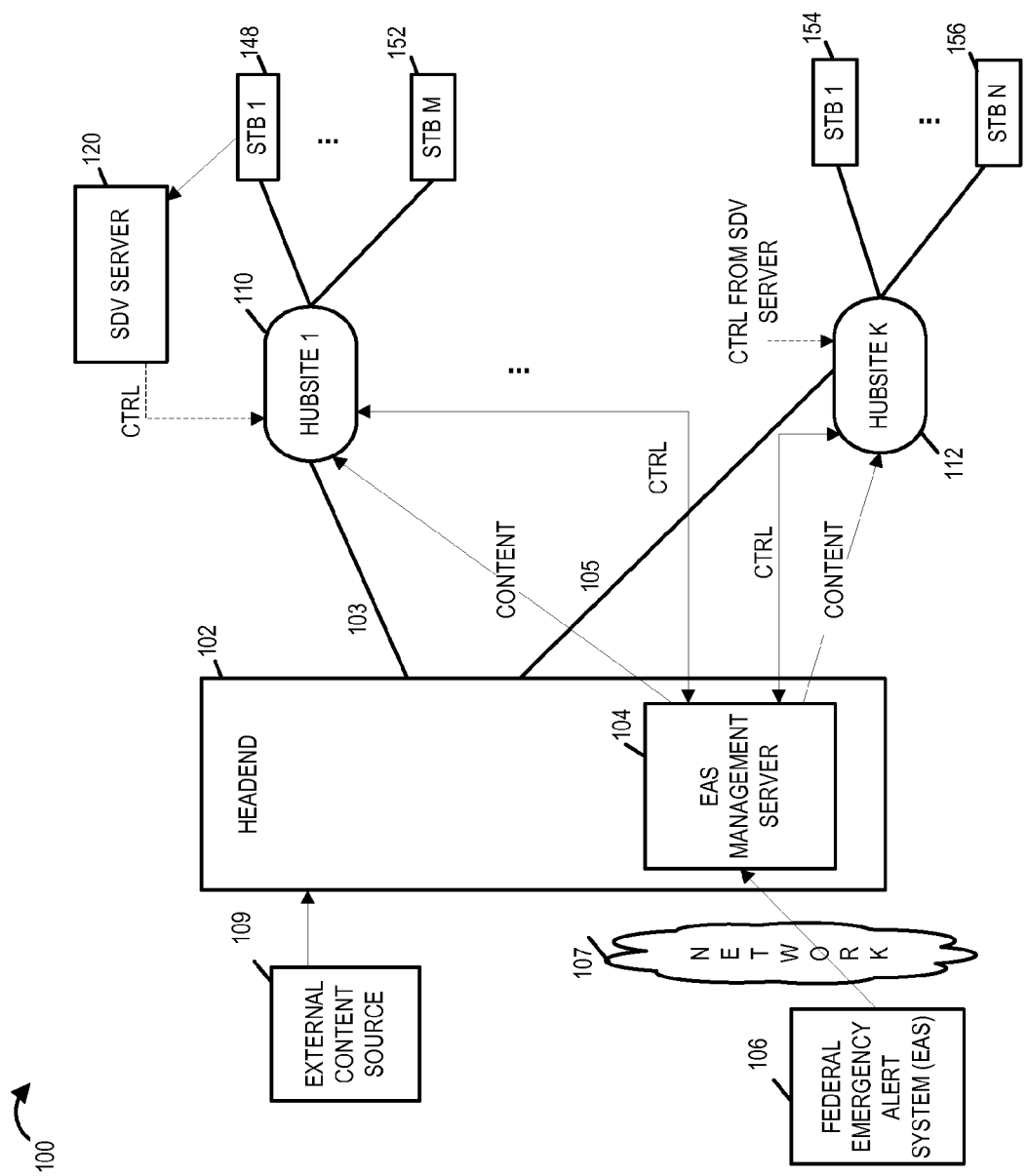
FIG. 1 illustrates an exemplary system implemented in accordance with one embodiment of the present invention.

FIG. 1 illustrates an exemplary system 100 implemented in accordance with one exemplary embodiment of the present invention. The system 100 shown in FIG. 1 supports delivery of content, e.g., video and audio content, and/or other information, between various devices, e.g., set top boxes, video systems/servers, etc.

The network headend 102 may be, and in some embodiments of the present invention is, implemented at a cable network office or site including multiple servers and databases which are coupled together. In the FIG. 1 example, the headend 102 includes, among other things, an emergency alert system (EAS) management server 104.

The EAS management server is used in some embodiments to receive and process emergency alert messages from, e.g., another system such as a government emergency alert system. In FIG. 1, an exemplary alert from the federal government's emergency alert system 106 is shown. The alert message from the government system may, and in some embodiments of the present invention, does indicate, e.g., the period of time for which the alert is in effect, the geographic region to which the alert applies and information, e.g., text or other information to be presented as part of the alert.

Using the information included in a received emergency alert message and stored information about the hubsites and/or headends serving particular regions, the EAS management server 104 identifies headends and/or hubsites corresponding to regions covered by the alert message and generates one or more control messages and/or content messages to be sent to the identified headends and/or hubsites. The one or more control messages control a switching device or devices included in the headends and/or hubsites, e.g., to switch from delivering normal program content to delivering emergency alert message content. Program channels, e.g., program channels corresponding to national or regional content sources which incorporate emergency alert message information in banners or in another format into the content being delivered via the program channel need not, and are not in some embodiments, switched to the emergency content message source. However, local channels, e.g., hotel channels and/or other channels which do not incorporate emergency alert messages are switched to the emergency alert message content source.

The emergency alert message content source may be an audio channel output, a video channel output and/or a combined audio-video channel output of the EAS management server or another device which generates the emergency message content streams, e.g., from emergency alert messages received from the government or another source. The control information, used to switch various channels, e.g., corresponding to different QAM modulators (QAMs), to an emergency content stream, is provided to the hubsites and/or headends in one or more messages. The messages may be in the form of standard switched digital video control messages with the emergency message streams being treated as content sources which can be switched by a controllable switching device in the headend or hub to be output on a particular frequency to which information is modulated for purposes of sending data to a customer premise device, e.g., STB.

In some but not necessarily all embodiments, information which is broadcast to the set top boxes from the headend or website is updated under control of the EAS management server so that customer premise devices will recognize the transport stream and program ID or IDs used in the emergency message streams and will thus decode and output, e.g., display and/or output in audio format, the emergency message information communicated to the customer premise devices.

At the end of an alert, the EAS management server, signals the hubsites and/or headends to switch from outputting the emergency alert message stream or streams to outputting the normal program channel or channels. Channels which were not switched to the emergency message stream are not affected by the switch back to the standard program streams.

If transport stream and/or program ID information being broadcast was altered with the transmission of the emergency management systems, the broadcast of transport stream and/or program ID information is switched to outputting the normal program channel transport stream and program ID information as the channels which were switched to the emergency alert message stream are switched back to outputting the normal program channels.

While switching between inputs and outputs occurs in the headend and/or hubsites as a result of the emergency alert message broadcast process, re-tuning of set top boxes or other customer premise devices in order to supply them with emergency alert messages is avoided.

The hubsite or headend switching can be implemented in a relatively quick time frame and in a manner that is relatively transparent to the customer premise devices and the users thereof.

Given that a single EAS management server can interface with and supply emergency content streams to multiple hubsites and/or switching centers, the number of EAS management servers can scale with system size in a cost effective manner. Furthermore, since the EAS management servers and/or other devices used to generate the emergency message content streams need not decode or combine emergency message content with the content of previously generated video and/or audio frames being supplied as part of an individual program channel, EAS management servers can be, in many cases are, implemented using less computationally complex hardware than systems which perform decoding and merging of emergency message content with previously encoded video frames.

In various embodiments, the EAS management server receives standard EAS system alerts from a standard EAS source such as a Trilithic or Monroe (brand) EAS system, determines which channels and hubs are to be switched and for how long. The decision can be based on Federal Information Process Standards (FIPS) information (similar to zip code) included in the EAS alert messages received from the standard EAS system. The EAS manager generates one or more EAS broadcast streams or signals (one for audio only channels, another for audio/video channels, and/or another for video only channels). The generated emergency management content message streams are multicast to the distribution sites (hubs and/or headends) thereby providing one, but often multiple, sites with the same emergency management content stream. The distribution sites can switch between the normal channel source and an EAS multicast source provided by the EAS management server. When the distribution point changes one or more channels to an EAS source which were previously provided with content from regular sources, e.g., local switched digital video content sources, the EAS multicast, e.g., emergency alert message stream, is distributed by the distribution point or points for the duration of the alert for those channels which are switched. The switching of the sources is controlled by the EAS management server which supports various switching options.

In some embodiments, the EAS management server sends an emergency alert control message to each hubsite's content source switch/router control module for which an EAS message needs to be broadcast to its customer premises devices. The emergency alert control message commands can include commands for example that control when the switch/router should replace one or more normal broadcast program sources with an EAS message content source, the EAS message content source with which the one or more particular program sources should be replaced, which programs should be replaced and which should not be replaced with an EAS message, and when normal program content sources should be switched back.

In some embodiments a map is generated by the EAS management server and/or another device in the headend or hubsite that is transmitted to the switcher/router and/or its associated controller to control the replacement of normal content sources with EAS message content sources upon the receipt of an emergency alert control message from the EAS management server. The map associates each regular program and/or channel with an emergency alert content source stream number or identifier that identifies what EAS alert source content stream should be switched onto the corresponding channel to replace the normal program in the event an emergency alert control message is received from EAS management server. In some embodiments, an EAS stream number/identifier of 0 indicates that no EAS stream is to replace the corresponding existing program being broadcast on the channel. The EAS stream number/identifier of 0 may be, and in some embodiments of the present invention is, used where a source incorporates EAS messages in a banner on frames which are communicated by the source. In the same exemplary embodiment an EAS stream number/identifier of 1 mapped or associated with a source indicates to switch to an EAS audio/video multicast, a 2 indicates to switch to an EAS audio multicast source and 3 indicates a switch to a maintenance source, e.g., a source which may be used to transmit system test messages to make sure the EAS system is functional. Table 800 of FIG. 8 depicts an exemplary mapping of an EAS sources/control commands with EAS stream numbers/identifiers. Row 1 of table 800 shows that stream number/identifier 0 is not associated with any EAS content stream and that channels mapped to stream number/identifier 0 do not switch on an EAS alert or receipt of an emergency alert control message from the EAS management server. Row 2 of table 800 shows that stream number/identifier 1 is associated with an encoded EAS Program Stream at a particular Multicast Source IP Address and Multicast Source Port Address. The X's and Y's depicted in the table are representative of any numerical number. Row 3 of table 800 shows an EAS stream number/identifier 2 is associated with an Encoded EAS Audio Stream for replacing Music Channels having a particular Multicast Source IP Address and Multicast Source Port Address. Row 4 of table 800 shows an EAS stream number/identifier 3 is associated with an Encoded Maintenance Slate which may be a test stream at a particular Multicast Source IP Address and Multicast Source Port Address. The data and information of table 800 may be, and in some embodiments of the present invention is stored for access and use in the memory of the EAS management server and/or each headend's and/or hubsite's switch/router controller or memory associated therewith.

Table 1000 of FIG. 10 depicts a channel/programming mapping to the EAS source stream number/identifier of table 800. FIG. 10 includes FIGS. 10A, 10B, and 10C. Column 1002 of table 1000 of FIG. 10 associates the EAS stream number/identifier of FIG. 8 table 800 with a particular program being broadcast on a channel. It indicates which EAS content source stream number/identifier should be switched onto the channel to replace the current program depicted on the same row. For example, row 7 of table 1000 indicates that on the receipt of an emergency control alert active message the Encoded EAS Program Stream having stream number/identifier 1 of table 800 of FIG. 8 and the associated Multicast Source IP Address and Multicast Source Port Address are to be switched in to replace the Univision/Telefutura HD program with QMS Control IP Address, Multicast Source IP Address and Multicast Source Port Address shown in row 7 of table 1000. As with table 8, the Xs and Ys shown in table 1000 are representative of any numerical value. The data and information depicted in table 1000 of FIG. 10 that map associated program channels and the EAS stream number/identifiers may be, and in some embodiments of the present invention is, generated in the EAS management server in the headend and stored in the EAS management server memory or memory associated therewith. In some embodiments, the data and information depicted in the table is transmitted from the headend to the hubsite and stored in memory in the hubsite for access by the edge/router and/or its associated controller upon receipt of an emergency alert control message. In other instances the information is loaded directly into memory in the hubsite without being transmitted from the headend.

In at least some embodiments, the number associated with an existing source in a command sent to a headend, hubsite or other switching device serves as an identifier of the emergency message source which is to replace the identified content source which is in use. In the case of a 0 indicating that no switch is to be performed a local affiliate may be contractually obligated to handle the alert transmission and/or the channel may already incorporate the alert messages thereby avoiding the need to switch to an emergency alert message source.

In at least some embodiment the EAS manager is responsible for controlling the QAM distribution points (hubs/headends) via their normal control capability (control message sent to control port/control IP address) corresponding to a particular channel) to switch from the normal channel broadcast source to an EAS alert source at the start of an EAS alert and then sends another control signal to switch the source back to the normal channel source at the end of the alert.

Thus, in at least some embodiments it is the responsibility of the EAS management server to generate EAS alert broadcast streams and to control the switching to/from the streams based on the duration of an alert.

The system 100 shown in FIG. 1 supports the delivery of content and/or information between various devices, e.g., external content sources, federal emergency alert system 106, headend 102 equipment, hubsites 110, 112, set-top boxes 148, 152, . . . , 156 and more generally customer premise equipment. In system 100 of FIG. 1, external content source 109 provides content to the headend 102. In various embodiments of the present invention, more than one content source is supplied to the headend 102 for transmission to the various hubsites. The external content source 109 may be, and in some embodiments of the present invention, is a video and/or audio transmission from another system such as a satellite transmission and/or a transmission from the national broadcasting service. Other exemplary external content sources include over the air television transmission, video and/or audio provided by video systems and/or servers. External content source 109 can, and in some embodiments of the present invention is, provided by other headends.

The Federal emergency alert system (EAS) 106 of FIG. 1 is an exemplary emergency alert system that provides emergency alert messages, e.g., information, alerts and/or other content, during times of emergencies, e.g., presidential addresses, AMBER alerts, and/or weather information targeted to specific areas. The emergency alert message is transmitted from the Federal Emergency Alert System 106 through network 107 to headend 102 of system 100. The headend 102, hubsites 1 (110) through hubsite k (112), switched digital video server 120 and exemplary set top boxes may be, and in some embodiments of the present invention are, part of cable or other content distribution system. In various embodiments of the present invention, the headend 102 includes various devices for receiving, processing, storing, and transmitting messages, information, and/or content. For example, headend 102 may, and in some embodiments of the present invention does, include receivers, decoders, encoders, encryptors, decryptors, switches/routers, processors, servers (e.g., EAS management server, trilithic server), transmitters and/or memory. As shown in FIG. 1, headend 102 of system 100 includes a Emergency Alert System (EAS) Management Server 104.

The Emergency Alert System Management Server 104 receives emergency alert messages from the federal emergency alert system 106 through a communication path shown as network 107. Instead of the EAS Management Server 104 receiving the emergency alert message, in various exemplary embodiments, a trilithic or similar EAS system in or associated with headend 102 may receive the emergency alert message from the Federal Emergency Alert System over network 107 and communicate the alert message to the EAS management server using SCTE 18 interface protocols. The headend 102 communicates with each of the hubsites 1 through K through one or more communication links. For example, in FIG. 1 a communication link 103 is shown connecting the devices of the headend 102 with the hubsite 1 (110). Exemplary communication link 105 connects the headend 102 to hubsite K (112). While only two hubsites 110 and 112 are specifically depicted in FIG. 1, the ellipsis indicates that a number of hubsites may be, and in some embodiments are, actually connected to the headend 102. Each hubsite represented by the ellipsis would be connected to the headend over one or more communication links.

Exemplary communication links 103 and 105 can, and in some embodiments do, include multiple links and/or channels that can transmit and/or receive a variety of control, data, and content information and/or messages. Also shown are content and control message links between the EAS Management Server 104 and each of the hubsites (e.g., hubsite 1 (110) and hubsite K (112). The EAS Management Server 104 would transmit emergency alert content messages (e.g., audio and/or video emergency alert transport streams) to hubsites via the content link and emergency alert control messages via the control link. In various embodiments of the invention the control and content links may be, and are the same link. The control and content links may be, and in some embodiments do, include multiple links and/or channels. In various embodiments of the present invention the control and content links which emanate from the EAS Management server may be and are included in the general links 103 and 105 which connect the headend to the hubsites. Note the links shown may be, and are, in some embodiments physical, virtual, logical and/or a combination of physical, virtual or logical links.

Hubsite 1 (110) of system 100 shown in FIG. 1 is an exemplary hubsite in various embodiments includes various devices for receiving, processing, storing, and transmitting messages, information, and/or content. For example, hubsite 110 may, and in some embodiments of the present invention does, include receivers, decoders, encoders, quadrature amplitude modulators (QAM modulators), encryptors, decryptors, switches/routers, control modules, processors, servers, transmitters and/or memory (e.g., configuration information and/or tables). Exemplary hubsite 110 receives content and control messages from the headend and/or other sources such as the switched digital video server 120 and transmits the content to the customer premise devices such as set top boxes 148 to 152 over communication links connecting the hubsite 110 to the customer premise devices, e.g., set top boxes. Set top boxes are only exemplary customer premise devices. The invention is applicable to any equipment in the customers' premises (or other appropriate locations) that can receive content distributions from the hubsite. Exemplary set top boxes include digital one-way and two-way set-top boxes. One way boxes only receive instructions and content while two-way set top boxes can also transmit messages for example to the hubsite requesting a particular switched digital video service.

A hybrid fiber cable (HFC) network is an exemplary network that may be, and is, used in some embodiments of the present invention to connect the customer premise devices (e.g., set top boxes, computer, multimedia devices) to the hubsite. In such an exemplary network the communication links connecting the hubsite to the customer premise devices which include fiber and cable transmission lines.

Exemplary hubsite K (112) is connected to a plurality of exemplary customer premise devices shown as set top boxes (STB 1 (154) to STB N (156) over a network, e.g., cable network, HFC network, fiber to the home network, fiber to the curb network, or cable network, consisting of one or more physical and/or logical links.

In various exemplary embodiments of the present invention, upon receipt of an EAS message alert from the Federal EAS system 106 by the EAS Management Server 104 over network 107, the EAS Management Server 104 constructs and transmits one or more emergency alert message content streams to each of the appropriate hubsites (e.g., hubsite 110 if the emergency alert message content is to be distributed to set tops connected to the hubsite 1 110 (e.g., STB 1 (148). The EAS Management Server 104 may, and in some embodiments does, transmit one or more emergency alert control messages to the appropriate hubsites to control the switching of content from normal programming to the one or more emergency alert message content streams. In an exemplary embodiment, the EAS Management Server 104 transmits its emergency alert control messages on the control (CTRL) link connecting the EAS Management Server 104 with each of the appropriate hubsites and the EAS Management Server 104 transmits its emergency alert message content on the (CONTENT) link connecting the EAS Management Server with each of the appropriate hubsites. In some embodiments, upon receipt of the emergency alert control message the hubsite switches the source content from the regular program content to the appropriate emergency alert message content for each of the channels currently being transmitted to the set top boxes. The hubsites then distribute the content to the set top boxes on the same channels and frequencies which the set top boxes are already tuned to. In some embodiments, the specific emergency alert message content to be transmitted in replace of a specific program and/or on a specific channel may be identified in a data structure stored in memory in the hubsite which maps each program/channel with the identity of the specific emergency alert message content stream, if any, with which it is to be replaced upon receipt of an emergency alert control message indicating there is an emergency alert in progress. Upon the receipt by the hubsite of an emergency alert control message from the EAS Management Server that the emergency alert is no longer in progress, the hubsite will switch back the normal programming content to each of the channels being distributed to the affected set top boxes. The hubsite may also switch back to the content source of the normal program after the expiration of a emergency alert time period.

Elements bearing the same reference numbers correspond to the same or similar elements throughout the application.

Figure 2:
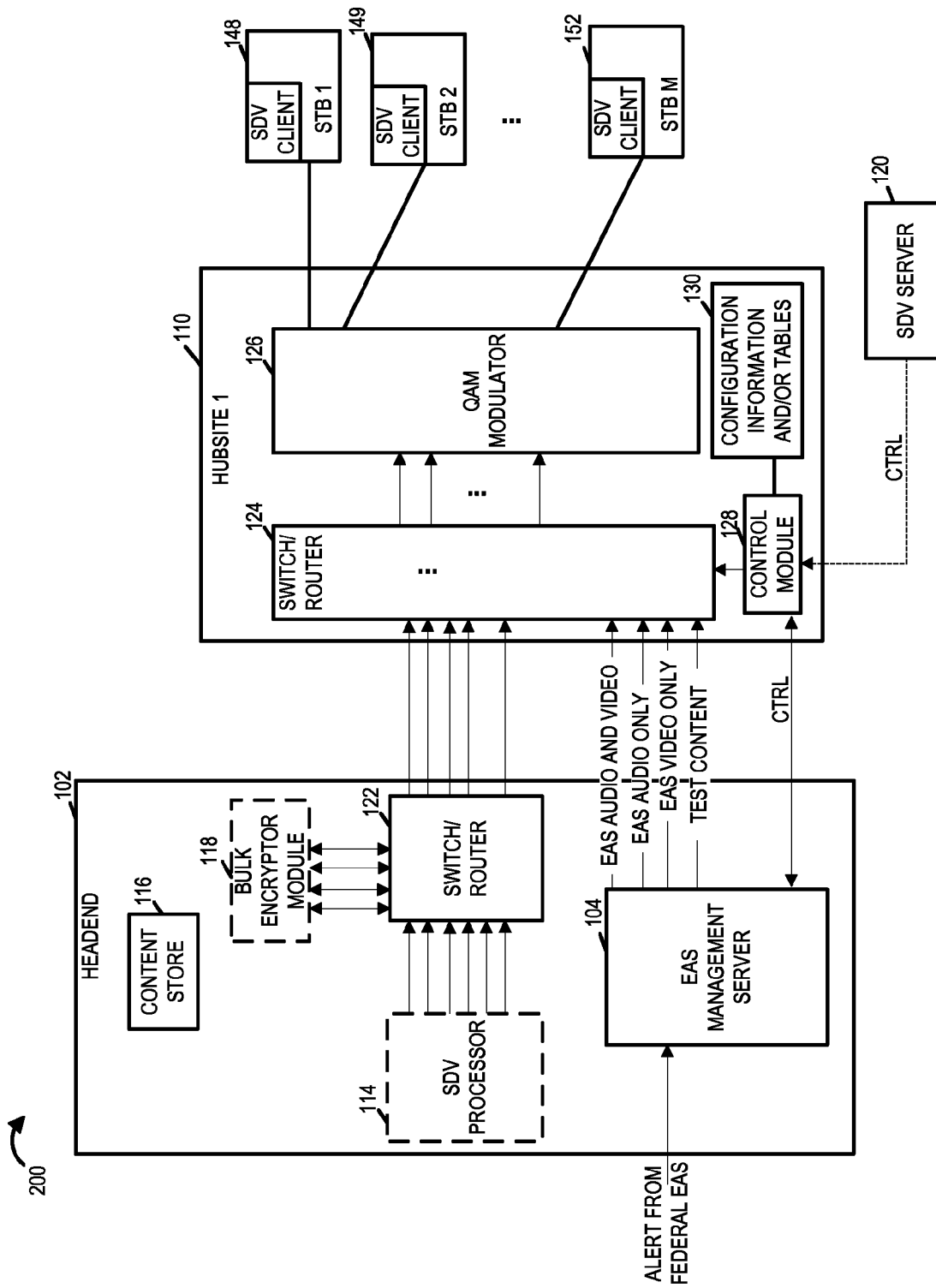
FIG. 2 illustrates various elements of the exemplary system shown in FIG. 1 in greater detail.

Diagram 200 of FIG. 2 illustrates various elements of the exemplary system shown in FIG. 1 in greater detail. For example, headend 102, hubsite 1 110 and set top boxes 148, 149 and 152 are shown in greater detail. Headend 102 contains content store 116 which is memory used for storing content e.g., programming content, switched digital video content, and on-demand content, received from one or more sources by the headend 102. Headend 102 may, and in some embodiments does include a bulk encryptor module 118 used to encrypt some but not necessary all video and/or audio content to be transmitted from the headend 102 to the various hubsites. Headend 102 may, and in some embodiments does, include a switched digital video (SDV) processor 114 that is connected to a switcher/router 122 of headend 102 that outputs switched digital content and/or control messages to the switcher/router 122. The switcher/router 122 is connected to bulk encryptor 118 and may switch content to be encrypted to ports on the bulk encryptor for encryption and switch and/or route encrypted content to be output to the switcher/router of the hubsites. The switcher/router 122 routes content provided to it to one or more switcher/routers 124 at each of the hubsites requesting content. For example, the switched digital video (SDV) client of set top box may request via a message sent to the hubsite 110 a particular video program. The set top box message request may and in some embodiments is transmitted to the headend 102 and in particular the SDV processor 114 and/or the SDV server 120. The SDV processor 114 may, and in some embodiments does, cause the requested switched digital video content which is stored in content store 116 to be encrypted by bulk encryptor module 118 and outputted from the switch/router 122 and sent to the switch/router 124 of the hubsite 110 for transmission to the set top box STB 1 148 via QAM Modulator 126. In some embodiments the SDV server may send one or more control messages to hubsite 110 via switch/router 122 to coordinate the routing of the requested program content from the headend 102 to QAM modulator module 126 which is communicating with STB 1 148. In some embodiments the switched digital content is sent to the STB 1 148 from the SDV Server 120 with the routing of the content controlled by the SDV server 120 through messages sent to the control module 128.

Headend 102 also includes an EAS Management Server 104, a more detailed exemplary embodiment of which is described in connection with diagram 600 of FIG. 6. The EAS Management Server in some embodiments is connected to and receives alerts from the Federal EAS system. The EAS Management Server 104 generates and outputs one or more emergency alert control messages to control module 128 of hubsite 1 110 that controls the switch/router 124 of hubsite 1 110. The EAS Management Server 104 also generates and outputs emergency alert message content to switch/router 124 of hubsite 1 110. Examples of emergency alert message content that is generated and output include an EAS Audio And Video Stream, an EAS Audio Only stream and EAS Video Only stream and a test content stream. The emergency alert message content streams are transmitted to the hubsite 1 110 switch router through one or more links connecting the EAS Management Server 104 and the Switch/Router 124 inputs. The control messages are communicated from the EAS Management Server over one or more links connecting the EAS Management Server 104 and the control module 128 of the hubsite 1 110.

The hubsite 110 includes a switch/router 124 which receives inputs from and is connected to the headend 102 and in particular in the exemplary embodiment the output of switch/router 122 of the headend 102 and the output of EAS Management Server 104. The switch/router 124 receives various content sources at its input and routes the content sources to specific outputs based in some cases on commands received from control module 128. Hubsite 1 110 also includes 130 configuration information and/or tables stored in memory which is accessed by at least the control module 128 to obtain configuration information and switching information for Switch/Router and in some embodiments for the QAM Modulator 126. In some embodiments the QAM modulator module 126 is a set or pool of QAM modulators that contains one or more QAM modulators that modulate content and/or messages outputted to them by the switched/router for modulation and transmission to the set-top boxes 148, 149, and or 152. The configuration information and/or tables 130 may and in some embodiments does include the information stored in map/table 800 of FIG. 8, map/table 900 of FIG. 9 and map/tables of FIG. 10 including FIG. 10 A, FIG. 10 B, and FIG. 10 C.

The following is an example of how an alert from the federal EAS system may, and in some embodiments of the present invention does, cause the transmission of one or more alert messages to be sent to a one or more customer premise devices, e.g., set top boxes in accordance with the present invention. The example is provided in view of diagram 200 of FIG. 2. An emergency alert from the federal EAS system 106 is received by the EAS Management Server 104 over network 107. The emergency alert includes FIPS geographical code area information and content to be transmitted to customer premises devices in the identified area. The EAS Management Server generates an EAS Audio and Video Stream identified as stream 1 based in part on the content of the emergency alert received. The EAS Management Server generates an EAS Audio Only stream identified as stream number 2 based in part on the content of the emergency alert received. The EAS Management Server generates an emergency alert control message that commands the activation of the emergency alert operation. The EAS Management Server uses the FIPS code received with the emergency alert to lookup in memory e.g., database 614 of FIG. 6, the identity and destination addresses of the hubsites and/or QAM Modulators within each hubsite that is distributing content to customer premises devices in the identified FIPS code area. The EAS Management Server 104 than transmits emergency alert message content streams e.g., the EAS Audio and Video stream, EAS Audio Only stream, to the input of the switch/router 124 of each identified hubsite. The EAS Management server 104 then transmits an emergency alert control message to the control module 128 of each of the identified hubsites (e.g., hubsite 1 110). In some embodiments the control module 128, upon receipt of the emergency alert control message indicating the activation of emergency alert operation accesses configuration information and/or tables which can, and in some embodiments does include, the mapping information contained in tables/maps 800, 900, and 1000 of FIGS. 8, 9, and 10 respectively. Using the information in table 1000, the control module 128 determines which channels/programs are to be replaced with emergency alert message content stream number 1 or 2 and which channels and programs are not be switched. The control module 128 then causes switch/router 124 to connect the correct emergency alert message content stream 1 or 2 to the appropriate outputs to be input to the QAM modulator so transmission to the set top boxes 148, 149 and 152 which are in the FIPS geographical area. The mapping information for tables 800, 900 and 1000 may be generated by the EAS Management Server 104 and provided to the hubsites in advance of an emergency alert. Upon termination of the emergency alert the EAS Management Server 104 can send an emergency alert control message to the control modules 128 of the identified hubsites. Upon receipt of this control message, the control module can access the table 1000 and using the information contained therein route the regular program content back out on the channels that were previously receiving emergency alert message contents streams 1 or 2.

Figure 3:
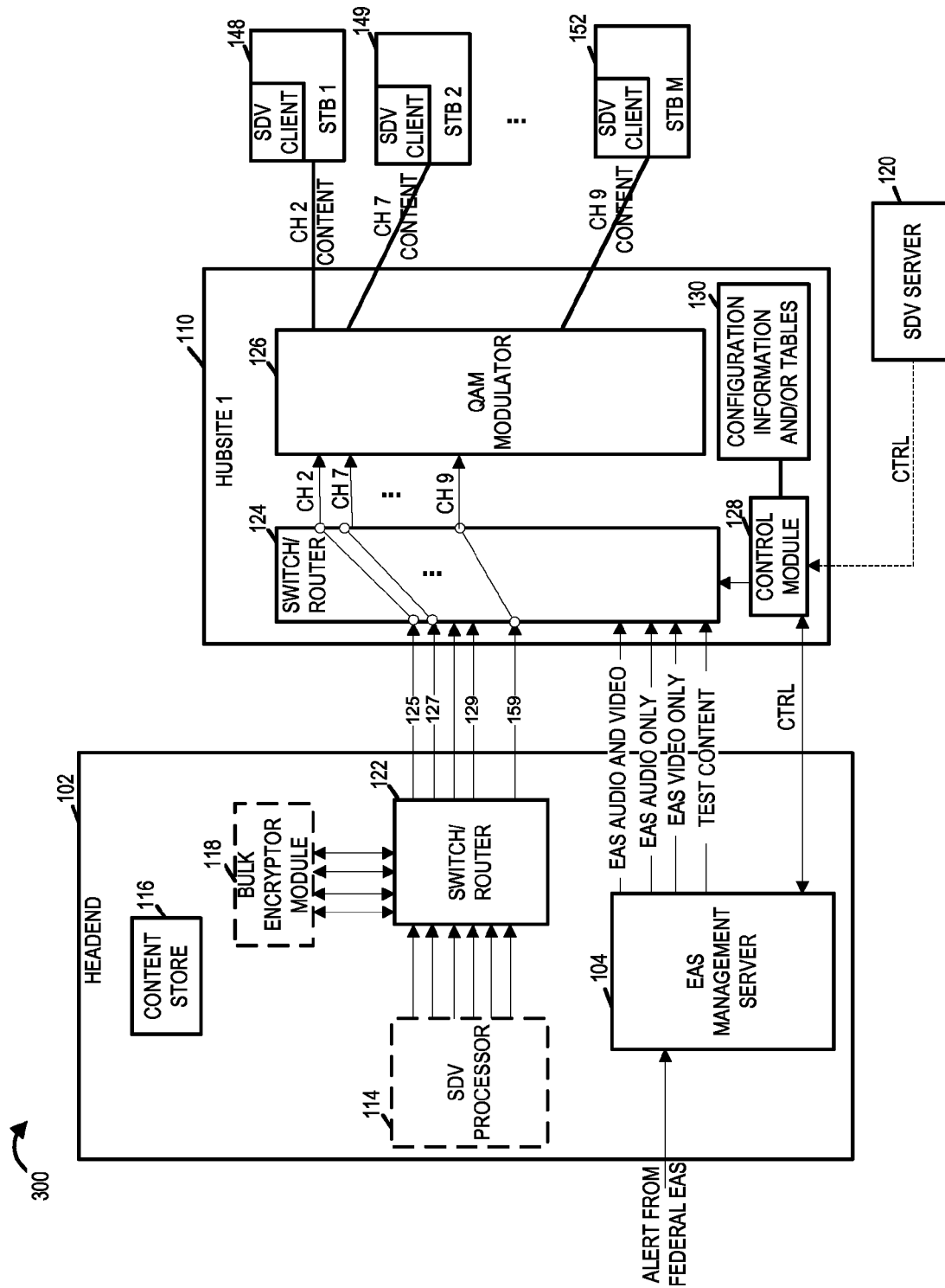
FIG. 3 illustrates various elements of the exemplary system shown in FIG. 1 during normal operation in accordance with an embodiment of the present invention.

FIG. 3 illustrates various elements of the exemplary system shown in FIG. 1 during a normal, e.g., non-alert, distribution mode of operation in accordance with an embodiment of the present invention. In the FIG. 3 example, STB 1 148 requested program channel 2 from an SDV server 120, STB 2 149 requested program channel 7 from the SDV server 120 and STB M 152 requested channel 9 from the SDV server 120. Note that during the normal mode of content distribution shown in FIG. 3, the content corresponding to regular program channels 2, 7 and 9 is output to QAM modulator module 126 (which may include a plurality of QAM modulators) for modulation on to carrier frequencies and delivery to customer premise devices 148, 149, 152 respectively. The STBs 148, 149, and 152 were notified as to which frequencies the requested content was being delivered on and tuned to the appropriate frequency to receive the content. Note that the different set top boxes may, and in some cases will be, tuned to different frequencies given that they are receiving different program channels.

The various inputs to the switch/router 124 shown in FIG. 3 correspond to, and receive content from, different content sources. Arrow 125 represents the supply of content corresponding to program channel 2, from a channel 2 program content source. Arrow 127 represents the supply of channel 7 program content from a channel 7 program content source while arrow 159 represents the supply of channel 9 program content from a channel 9 program content source. In addition to having normal program channel content sources, the switch/router 124 also has additional inputs for various EAS content sources. The illustrated inputs include an EAS Audio and video input, an EAS audio only input, an EAS video only input, and a test content input. In some embodiments the EAS video only input is omitted and the EAS Audio only input receives an audio channel which is also supplied as part of the EAS Audio and Video input. Since FIG. 3 illustrates a normal mode of operation, the control module 128 controls the switch 124 in a manner which prevents any of the EAS inputs being output to the QAM modulator.

Figure 4:
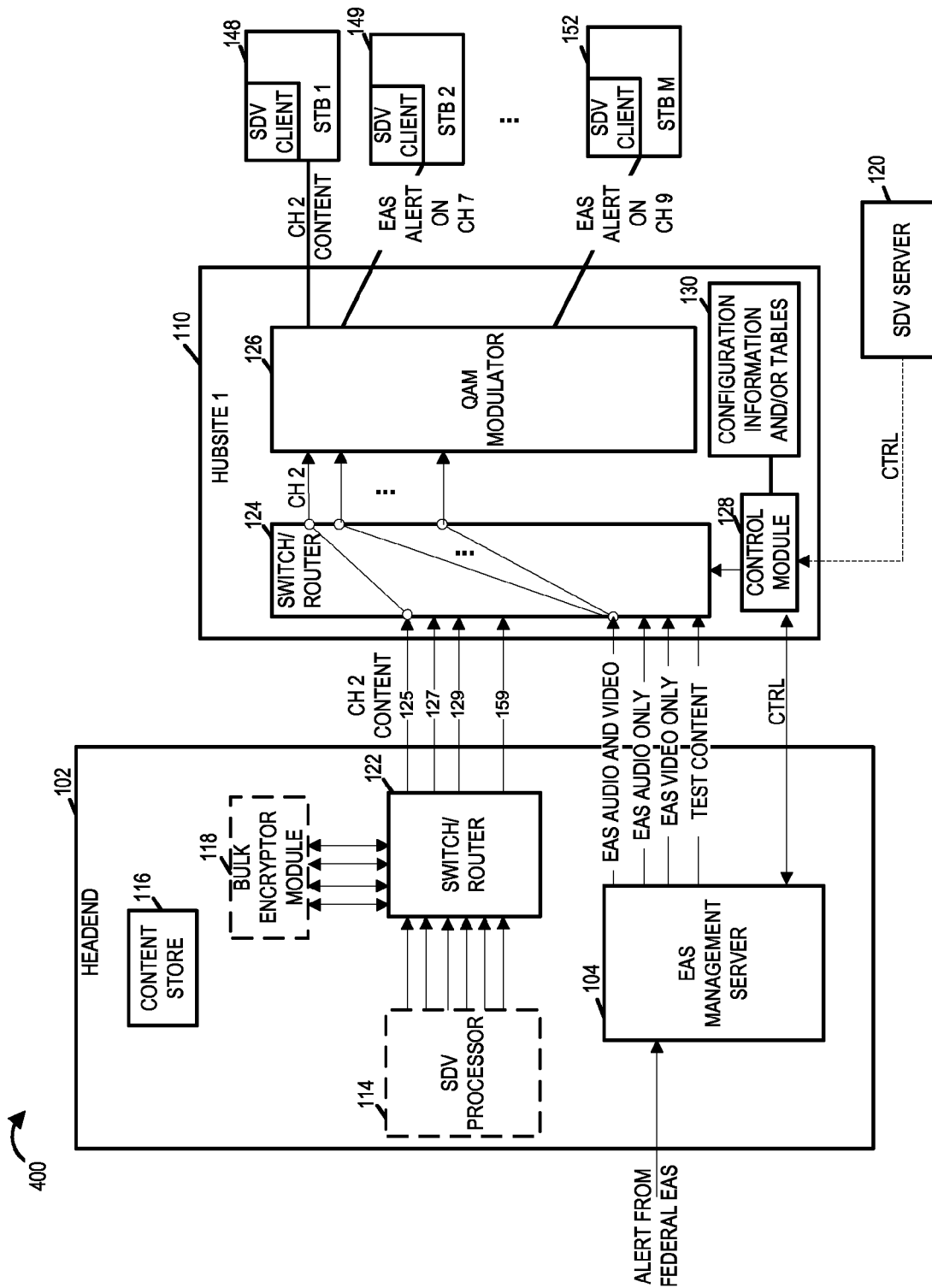
FIG. 4 illustrates various elements of the exemplary system shown in FIG. 3 during an emergency alert operation.

FIG. 4 illustrates the system of FIG. 3 during an EAS message content distribution mode of operation, e.g., during a period of time in which an EAS alert is in effect for the area being served by hubsite 1 110. Assume for purposes of explanation that content provider which supplied content for program channel 2 incorporates EAS alerts directly into the program channel 2 content when an EAS alert is in affect. However, program channels 7 and 9 correspond to audio and video content source providers which do incorporate EAS alert information into the audio-video program content they supply. In such a case the program channel mapping information would indicate in case of an alert that program channel 2 is not subject to a content source switch, e.g., there would be a "0" in the last row of a table such as the one shown in FIG. 10 for program channel 2 indicating a "no switch" on alert condition. However, for audio-video channels 7 and 9 the program channel mapping information would indicate that in the event of an alert, outputs which are being supplied with content corresponding to program channels 7 and 9 should be switched to the EAS audio and video content source input.

Thus, as shown in the FIG. 3 example, during the alert mode of operation, hubsite 110 switches the outputs previously coupled to the channel 7 and 9 content inputs to the EAS Audio and video content source input. Notice however, the connections from the switch 124 to the set of QAM modulators 126 is unaffected. As a result, channel 2 program content will still be broadcast on the frequency used prior to the alert to deliver program channel 2 content. However, the frequencies used prior to the emergency alert to deliver program channels 7 and 9 are now used to deliver content from the EAS Audio and Video content source. Thus, set top box 2 149 and STB M 152 will receive the EAS message content in audio-video format without having to retune. Furthermore, a user can change channels in a normal manner and, if desired, switch to program channel 2 and see the EAS information in the manner incorporated into the channel 2 program content rather than as it is communicated on the EAS audio and video channel.

Thus, during an alert, if desired, a user can still change channels and see the alert information on a channel which provides the alert as a banner or on a portion of the screen with additional news or regular programming content.

Assuming that a user does not change channels during the alert, at the end of the alert, the hubsite 110 switches from the alert message content distribution mode of operation back to the regular content distribution mode of operation. As part of the switch back to the normal mode of operation, outputs which were switched to an EAS channel content source are switched back to the normal program channel content source input to which they were coupled prior to the alert.

Figure 5:
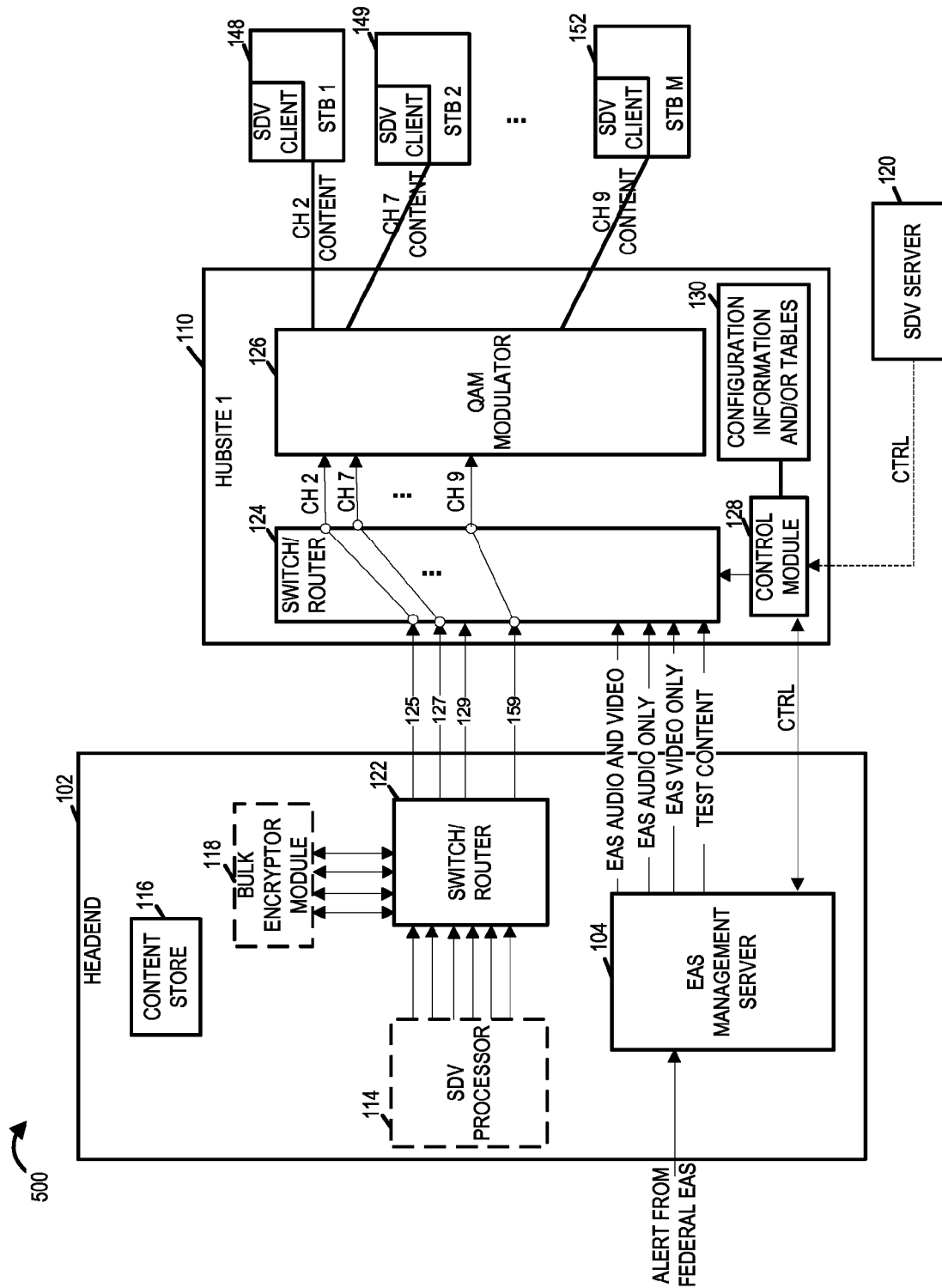
FIG. 5 illustrates various elements of the exemplary system shown in FIG. 4 after an emergency alert operation has concluded and normal operation is once again commenced in accordance with one embodiment of the present invention.

FIG. 5 is a drawing 500 illustrating various elements of the exemplary system shown in FIG. 4 after an emergency alert operation has concluded and normal operation is once again commenced in accordance with one embodiment of the present invention. FIG. 5 illustrates the state of the hubsite 1 110 after the switch back to the normal mode of operation. Note that the program channels shown in FIG. 5 are being distributed in the same manner as they were being distributed in FIG. 3. It should be appreciated that the switching of content sources at the hubsites avoids any need for STBs to tune to a different channel to receive EAS message content and that it allows the STBs to receive EAS message content without having to embed or encoded it into the normal program channel content that was being supplied to the hubsite for a particular normal program channel.

While the invention has been explained with reference to switch 124, it should be appreciated that switch in this context is intended to refer to a switching device where the switching device may be a router or other device with switching capability.

Figure 6:
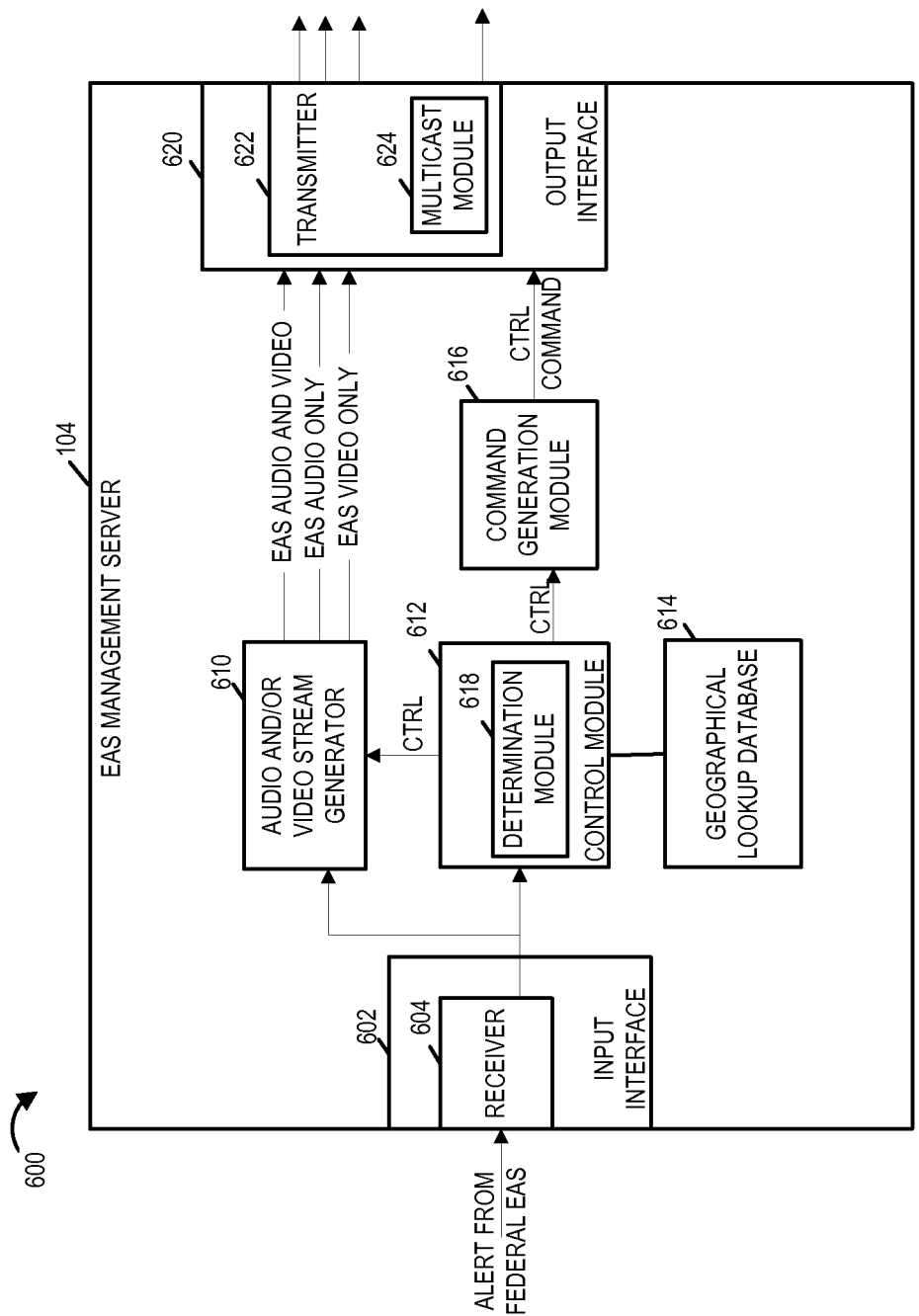
FIG. 6 illustrates various elements of the exemplary EAS Management Server in greater detail accordance with an embodiment of the present invention.

Diagram 600 of FIG. 6 illustrates various elements of the exemplary EAS Management Server 104 in accordance with an embodiment of the present invention. The EAS Management Server 104 includes, among other things, an input interface 602, an audio and/or video stream generator 610 which may be a module, a control module 612, a geographical lookup database 614, a command generation module 616, and an output interface 620. The EAS Management Server may, and in some embodiments does, include one or more processors and/or DSPs for performing processing operations and executing software instructions. The modules may be hardware, e.g., circuits, software, e.g., code instructions and/or a combination of hardware and software. In various embodiments the input interface 602 includes a receiver 604 for receiving signals from external devices and servers. In various embodiments the interface 604 is configured to receive one or more alert messages, e.g., from the federal EAS system 106. In some embodiments the control module 612 and the audio and/or video stream generator 610 receive an alert from the federal EAS system 106, e.g., via the input interface receiver 604. The alert may include among other things content information and FIPS geographical area code information, e.g., a geographic region identifier, that specifies the geographical area where the alert content should be distributed and duration of the emergency alert. In some, but not all embodiments of the present invention, each hubsite of the system 100 of FIG. 1 will be configured to be an EAS Zone correlated by FIPS Code (zones). Geographically lookup database 614 will contain information in memory correlating or mapping hubsites and there switching devices to the EAS Zones to FIPS Codes (zones) and in some embodiments the individual QAMs within the hubsites that distribute content to customer premise devices, e.g., set top boxes in the specific FIPS codes (zones). For each hubsite connected to the EAS Management Server 104, database 614 may, and in some embodiments, does include the information identified in exemplary EAS Zone configuration hubsite map 900 of FIG. 9 that maps the Federal Information Processing Standard (FIPS Code Area) for each hubsite and the corresponding QAM modulators of the hubsite. The control module 612 in addition to be connected to the geographical lookup database 614 is also connected to, among other things, the command generation module 616 and the audio and/or video stream generator 610. The audio and/or video stream generator 610 receives content information from the alert from the federal EAS 106 and generates one or more emergency alert message content streams based on the received information. In the exemplary embodiment shown the audio and/or video stream generator generates and outputs a stream containing EAS Audio and Video Content, a stream containing EAS Audio Only Content and a stream containing EAS Video Only content. In some embodiments the control module 612 can provide control signals to the audio and/or video stream generator 610 to include in the stream generated and output. The control module 612 can, and in some embodiments does, send control CTRL commands to the audio and/or video stream generator 610 to generate and output one or more emergency alert message content streams to various destinations, e.g., control modules 128 controlling the switch/router 124 of FIG. 2 in hubsites identified by FIPS geographical area code determined through the lookup in the database 614. The control module 612 may also send messages and/or control signals to the command generation module 616 to generate one or more emergency alert control messages (CTRL commands) and output or transmit the one or more control messages, e.g., via the output interface 620, to various destinations including to the same destinations to which emergency alert message content streams are to be sent, e.g., control modules 128 controlling the switch/router 124 of FIG. 2 in hubsites identified by FIPS geographical area code determined through the lookup in the database 614. In various embodiments the output interface 620 includes a transmitter 622 configured to transmit one or more emergency alert control messages to the switching device 124 and/or to the control module 128 controlling the switching device/router 124 of FIG. 2 in hubsite 110. In some embodiments the transmitter 622 is configured to transmit a first emergency alert control message to the switching device 124. In some embodiments the transmitter 622 is further configured to transmit one or more emergency alert message content streams, e.g., a first emergency alert message content stream, a second emergency alert message content stream, to the switching device 124. In some embodiments the transmitter 622 includes a multicast module 624 for multicasting the one or more emergency alert message content streams to a plurality of hubsites.

The control module 612 can coordinate the generation and transmission of the EAS content streams and control messages to be sent to the hubsites that the switch/router of the various hubsites only commence emergency switching of content sources after EAS content streams have been outputted from the EAS Management Server. The control module 612 can also, after receipt of an EAS alert termination message from the federal EAS system 106 or after a specified duration of time since the receipt of the EAS alert, send commands to the Audio and/or Video Stream Generator 610 and/or command generation module 616 to terminate the generation and outputting of emergency alert message content streams and emergency alert control messages. The control module 612 can send a signal or command to the command generation module 616 to generate and output to the various identified hubsite control modules 128 a turn off emergency alert switching operations emergency alert control message which would cause each hubsite switch/router to switch the affected QAMs input content sources back to their regular content program streams. In some embodiments the control module 612 controls the transmitter 622 to transmit a second emergency alert control message, e.g., EAS alert termination message indicating that the first emergency alert is no longer in effect, to the switching device/router 124.

In various embodiments the audio and/or video stream generator 610 (also sometimes referred to as content generation module) is configured to generate a first emergency alert message content based on at least some information included in a first emergency alert message, e.g., emergency alert message from the federal EAS server 106. In some embodiments the at least some information included in the first emergency alert message includes emergency alert message information. The audio and/or video stream generator 610, in some embodiments, is further configured to generate second emergency alert message content based on at least some information included in the first emergency alert message. In some embodiments the first emergency alert message content includes audio content and the second emergency alert message content includes video content. In some embodiments the first emergency alert message content is transmitted in a first audio stream. In some embodiments the second emergency alert message content is transmitted in a transport stream including the first audio stream and a video stream.

In some embodiments upon receipt of the alert and its associated information by the control module 612, the control module will parse the alert to identify the FIPS geographically area information provided and then use the FIPS area code information to access the geographical lookup database 614 and determine the EAS Zones and the corresponding hubsites and/or QAMs within the hubsites to which the EAS alert needs to be distributed. The geographical lookup database 614 may contain copies of the information contained in each of the hubsites. In various embodiments the control module 612 includes a determination module 618 configured to determine from at least some information included in a received emergency alert message, e.g., geographic region identifier, one or more switching devices to which an emergency alert control message is to be sent in response to receiving said first emergency alert message, said one or more switching devices corresponding to one or more hubsites which supply content to customer premise devices in a region identified by said geographic region identifier.

Figure 7A:
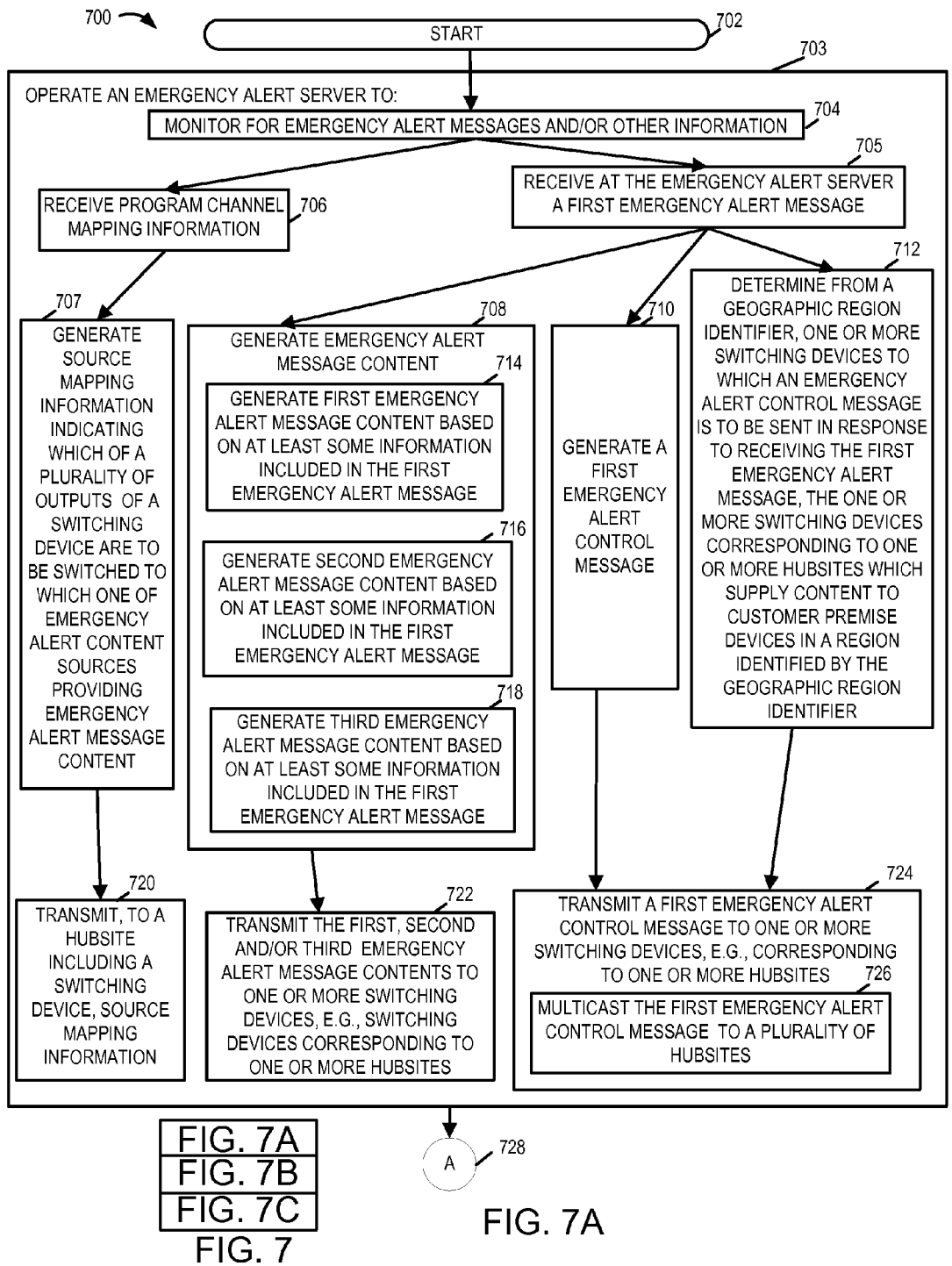
FIG. 7, which comprises the combination of FIGS. 7A, 7B and 7C, illustrates the steps of a method of providing emergency alert message information to set top boxes in accordance with one exemplary embodiment of the invention.
Figure 7B:
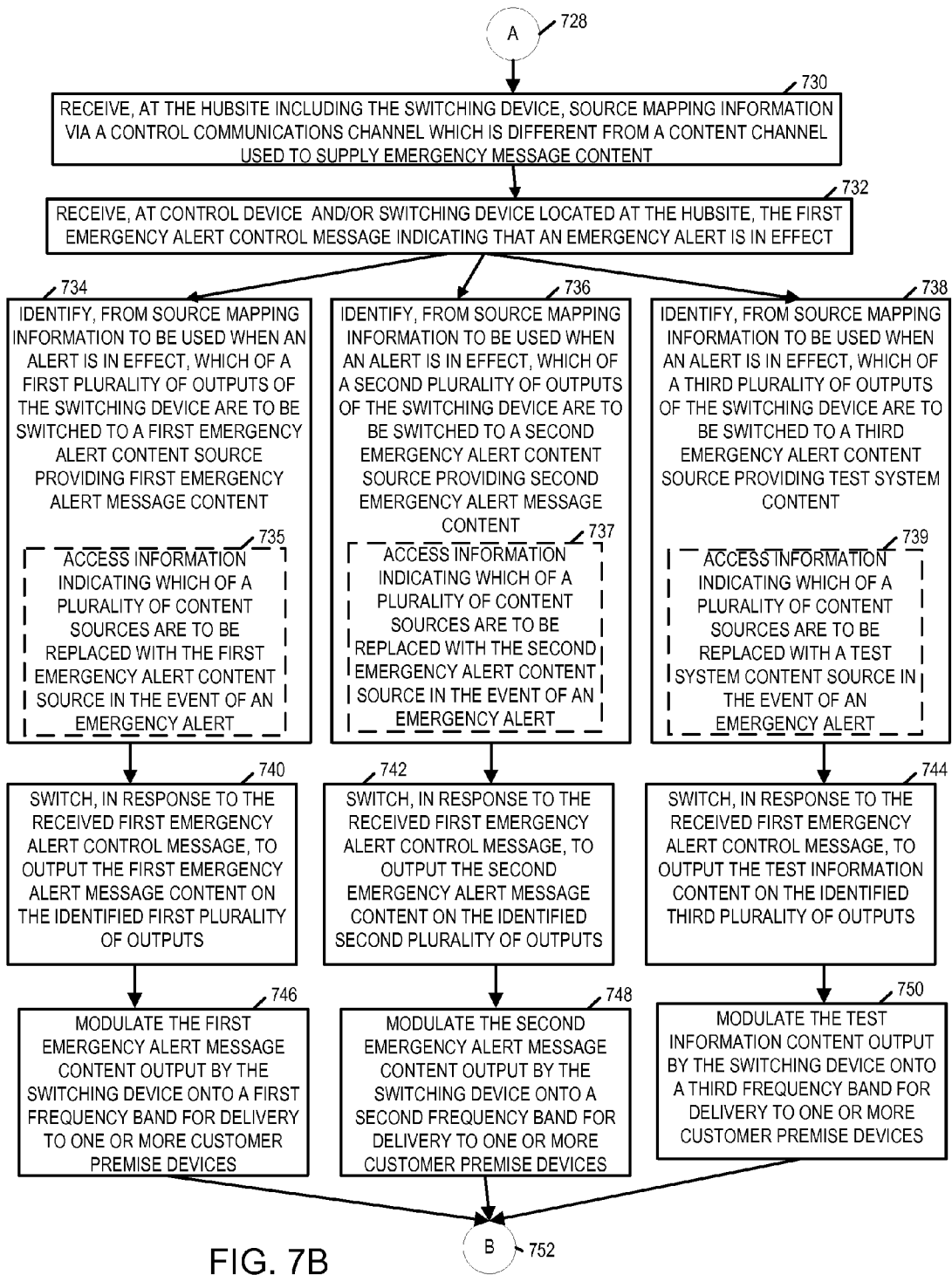
Figure 7C:
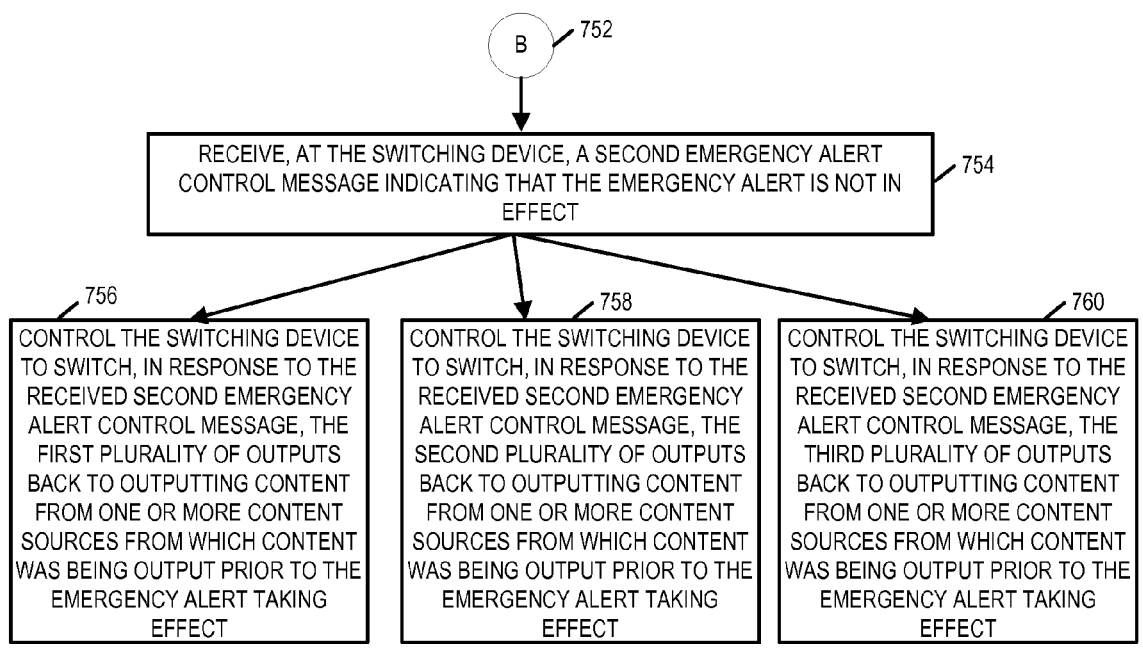

FIG. 7, which comprises the combination of FIGS. 7A, 7B and 7C shows the steps of a method 700 for providing emergency alert message information to set top boxes in accordance with one exemplary embodiment of the invention. The method 700 allows set top boxes to receive and output for display emergency alert messages, e.g., information, without have to retune.

The method 700 includes steps performed by various elements of an exemplary system, e.g., one of the exemplary systems shown in FIGS. 1-5. In one embodiment the steps shown in block 703 are performed by an emergency alert server, e.g., EAS management server 104, while various other steps are performed by various elements at a hubsite, e.g., hubsite 110 or other location where switching is performed.

The method 700 starts in step 702, e.g., with the various components in the system being initialized. Once active, the emergency alert server 104 monitors, in step 704, for emergency alert messages, e.g., messages from the Federal Emergency Alert System 106 and/or other information, e.g., channel mapping information from a business management system or other device indicating what channels are being communicated on what QAM frequency bands from various hub sites having a known geographic relationship to FIPS codes used to indicate geographic regions to which EAS alert messages apply.

In the case of channel mapping information being received, as shown in step 706, operation proceeds to step 707 in which the emergency alert management server 104 processes the supplied channel mapping information and generates source mapping information indicating which of a plurality of outputs or a switching device are to be switched to various emergency alert content sources providing emergency alert message content. The switching device maybe, e.g., a hub site switch or router 124 located at a particular hub site to which the received mapping information applies and the emergency alert content sources maybe, e.g., an audio source, a combined audio-video source or a test source. In some embodiments, as will be discussed below, the emergency alert management server 104 generates the audio, video and test emergency alert content streams to which outputs of a hubsite switch maybe switched in the event of an alert.

After generation of the source mapping information to be used in the event of an emergency alert for a hubsite or other switching site, e.g., headend, the mapping information is transmitted to the switching site. FIG. 10 shows an exemplary set of mapping information which may be generated in step 707 and transmitted to a switching site in step 720. While steps 706 and 708 are shown being performed by the EAS management server 104 in the exemplary embodiment they may be performed by another device, e.g., a business or other server responsible for generating channel maps. The mapping information of FIG. 10 may be sent a hubsite prior to an emergency alert or at the time of the emergency alert for use in controlling switching from normal channel inputs to emergency alert channel inputs for one or more channels. In at least some embodiments multiple channels which normally provide different channel content are switched to the same emergency alert channel input thereby resulting in the same emergency alert being distributed on multiple channels and avoiding the need to a set top box to have to tune to a different channel to receive emergency alert information. While the transmitting of mapping information represents the end of processing some information, operation of the emergency alert server 104 continues with the server 104 continuing to monitor in steps 704 for messages and/or other information.

In the case of an emergency alert message being communicated to the emergency alert management server 104, operation proceeds from step 704 to step 705 where the communicated emergency alert message is received by the emergency alert server 104. Operation then proceeds from step 705 to various steps including steps 708, 710, 712 which can be performed in parallel or sequentially.

In step 708 the content of a received emergency alert message is processed to generate various emergency alert content, e.g., audio content, video content and/or test content which may be transmitted in various corresponding streams. The audio and video emergency content may, and in some embodiments is transmitted as an audio emergency content stream and a video emergency alert content stream which may be combined in a transport multiple which represents a combined audio and video stream with individual stream components which can be accessed and processed individually if necessary.

In the FIG. 7 example, step 708 which is the step of generating emergency alert message content, e.g., from the emergency message content of a emergency alert message received from the federal EAS 106, includes various substeps. The substeps include step 714 in which the EAS management server 104 generates first emergency alert message content, e.g., audio content, based on at least some information included in the first emergency alert message. The first emergency alert message content may include an audio signal generated from alert message text and/or a prerecorded audio broadcast communicated as part of an emergency alert message received by the EAS management server 104. The substeps also include steps 716 and 718. In step 716 second emergency alert message content is generated based on at least some information included in the first emergency alert message. The information on which the second emergency alert message content is generated may include text and/or video which is to be displayed as part of an alert. In step 718 third emergency alert message content is generated. The third emergency alert message content may include a test pattern or other test message which may be based on at least some information included in the first alert message or locally generated test content.

The emergency alert message content generated by the EAS management server 104 from the content of a received emergency alert message is transmitted in step 722 to one or more switching devices, e.g., switching devices at hubsites and/or headends for potential distribution. In some embodiments the first, second and/or third emergency alert message content is multicast by the EAS management server 104 via a headend which also distributes other content, e.g., switched digital video content, to one or more hubsites. While the emergency alert message content may be distributed to more hubsites than those identified by FIPS information included in a received emergency alert message, in some embodiments, distribution of the emergency alert message content is based on, and limited to, switching cites which correspond to, e.g., deliver content to, a geographic region corresponding to an FIPS code included in the received emergency alert message. The generated and distributed emergency alert message content will vary as one or more new emergency alert messages are received.

In addition to generating and distributing emergency alert message content, the EAS management server also responds to a received emergency alert message by generating one or more emergency alert control messages which it then transmits to the hubsites and/or other switching sites to which the received emergency alert is applicable, e.g., because the hubsite distributes content to the identified geographic region to which the alert applies.

In step 710 a first emergency alert control message is generated, e.g., to control hubsites and/or other switching sites to distribute emergency alert message content. In step 712 which may occur in parallel or serially with respect to step 710, the EAS management server determines from a geographic region identifier, one or more switching devices to which an emergency alert control message is to be sent in response to receiving the first emergency alert message, the one or more switching devices corresponding to one or more hubsites or other switching sites, which supply content to customer premise devices in a region identified by the geographic region identifier included in the received emergency alert message.

Operation proceeds from steps 710 and 722 to step 724. In step 724 the first emergency alert control message is transmitted to one or more switching devices, e.g., corresponding to one or more hubsites. The emergency alert control message, when processed, controls the hubsites to which the message is directed to switch between a normal mode of operation and an emergency alert distribution mode operation or from an emergency alert distribution mode of operation back to a normal mode of operation. In some embodiments, the first emergency alert control message is multicast to a plurality of hubsites, e.g., over a control channel. The hubsites to which the emergency alert control message is multicast may correspond to a multicast group based on the FIPS region, e.g., hubsites corresponding to a first FIPS region are grouped into a multicast group while hubsites corresponding to a second FIPS region are grouped into a second multicast group. The use of multicast groups based on FIPS region and/or another geographic region identifier, facilitates distribution of both emergency alert message content and emergency alert control messages via a multicast to the multicast address of the multicast group to which an alert corresponds.

While much of the EAS management server has been explained with regard to the elements of block 703, the emergency alert method shown in FIG. 7 includes various additional steps which are shown in FIGS. 7B and 7C. Operation of the exemplary method continues in step 730 which may follow one or more of the steps shown in block 703. Connecting node 728 serves to show that the steps of FIG. 7B are part of the same method as shown in FIG. 7A. While the various steps performed by different devices are shown as part of an overall method, it should be appreciated that all the steps need not be performed together to be beneficial or provide a useful result. For example, hubsite steps may be implemented even if one or more messages are generated by a device other than an EAS management server.

The steps of FIGS. 7B and 7C may be implemented by one or more elements of a hubsite. In step 730 a hubsite including a switching device, receives source mapping information, e.g., via a control communication channel which is different from a content channel, e.g., a channel used to communicate an audio and/or video data stream, used to supply emergency alert message content. While the mapping information is sent over a control channel in some embodiments, in other embodiments it can be sent over a data channel, e.g., the same channel used to communicate emergency alert message content which is to be displayed or output as an audio signal.

Operation proceeds from step 730 to step 732. In step 732 the emergency alert message is received at the hubsite, e.g., by the switching device and/or control device included at the hubsite. In the exemplary embodiment, the first emergency alert control message indicates that an emergency alert is in effect, e.g., that the hubsite should operate in an emergency alert message distribution mode of operation. Operation proceeds from step 732 to steps 734, 736 and/or 738 which represent the start of processing paths corresponding to different sets of emergency alert message content which may be distributed. All processing paths need not be used in response to each alert given that one or more of the three supported emergency alert content sources may not be used for a particular emergency alert. In some embodiments the first emergency alert message content is audio content, the second emergency alert message content includes audio/video content and the third emergency alert message content includes emergency alert test message content. Auxiliary data, e.g., closed captioning or text data, may, but need not be included with each of the first second and third emergency alert message content.

The processing path corresponding to first emergency alert data includes steps 734, 740 and step 746. The processing path corresponding to second emergency alert message data includes steps 736, 742, 748. Similarly the processing path corresponding to the third emergency alert message data includes steps 738, 744 and 750.

Generally the processing paths correspond to operations implemented in a control and/or switching device of a hubsite or other switch site. The steps include determining which content sources supplying content to an output should be replaced with an emergency alert message content source and, in the case where a switch to an emergency alert content message source is to be made for a particular program stream, which emergency content source is to be used to replace the particular program stream. As should be appreciated, it may not be necessary to replace all content streams since some of the streams may already include emergency content information. Furthermore, for a given alert, one or more of the first emergency content source, the second emergency content source and the third emergency alert content source may be used. Normally the first emergency alert message content will be used to replace content corresponding to audio channels, the second emergency alert message content will normally be used to replace content corresponding to a video channel and the third message content will be used to replace content corresponding to channels on which emergency alert test information, e.g., a test signal and/or pattern, it be output. As should be appreciated, during an actual emergency alert, the emergency alert message test content will not be used and one or both of the audio and video emergency message content will be switched to one or more outputs. Channel mapping information is used to control which content source is used at a particular point in time. The channel mapping may be relatively static with information set at a hubsite corresponding to a single FIPS to be used in the event of an actual emergency alert or may be sent to the hubsite at the time of the alert or shortly before the alert.

In step 734, one of the hubsite elements, e.g., control module 128 or switch 124, identifies from source mapping information to be used when an alert is in effect, which of a first plurality of outputs of the switching device are to be switched to a first emergency alert content source providing first emergency alert message content. Step 734 may include accessing, in step 735, information, e.g., configuration/mapping information 130 stored in memory, indicating which of a plurality of content sources are to be replaced with the first emergency alert content source in the event of an emergency alert. The accessed information may be in the form of a table such as the one shown in FIG. 10 which may be generated and supplied to the hubsite by the EAS management server 104 or another device. For example, consider the FIG. 10 example in which case, outputs receiving content from the content sources associated with a "1" in the last column of FIG. 10 will be switched to the audio emergency alert content source in the event of an emergency alert.

Operation proceeds from step 734 to step 740. In step 740, the switch 124 switches, in response to the received first emergency alert control message, to output the first emergency alert message content on the identified first plurality of outputs. Operation proceeds from step 740 to step 746 wherein the first emergency alert message content is output by the switching device 124 onto a first frequency band for delivery to one or more customer premise devices. It should be appreciated that the first emergency content will normally be output on other frequency bands as well, e.g., used prior to the alert to deliver other program channels, but a single frequency band is mentioned in step 746 for purposes of simplicity in explaining the invention. Operation proceeds from step 746 to step 754 via connecting node B 752.

In step 736, one of the hubsite elements, e.g., control module 128 or switch/router 124, identifies from source mapping information to be used when an alert is in effect, which of a second plurality of outputs of the switching device are to be switched to a second emergency alert content source providing second emergency alert message content. Step 736 may include accessing, in step 737, information, e.g., configuration/mapping information 130 stored in memory, indicating which of a plurality of content sources are to be replaced with the second emergency alert content source in the event of an emergency alert. The accessed information may be in the form of a table such as the one shown in FIG. 10 which may be generated and supplied to the hubsite by the EAS management server 104 or another device. A number 2 is used in column 1006 to indicate that a switch to the second emergency content should be made in the case of an alert.

Operation proceeds from step 736 to step 742. In step 742, the switch 124 switches, in response to the received first emergency alert control message, to output the second emergency alert message content on the identified first plurality of outputs. Operation proceeds from step 742 to step 748 wherein the second emergency alert message content is output by the switching device 124 onto a second frequency band for delivery to one or more customer premise devices. It should be appreciated that the second emergency alert message content will normally be output on other frequency bands as well, e.g., used prior to the alert to deliver other program channels, but a single frequency band is mentioned in step 748 for purposes of simplicity in explaining the invention. Operation proceeds from step 748 to step 754 via connecting node B 752.

The processing path beginning with step 738 relates to the output of third emergency alert message content which, in one exemplary embodiment is emergency alert system test information, e.g., a test pattern and/or audio test signal. The third emergency alert message content may not be output during an actual alert. Accordingly, in at least some embodiments, third emergency alert information is output when first and second emergency alert information is not being output. However, in other embodiments, e.g., where the third emergency alert information is in a different language than the other emergency alert message content, third emergency alert content may, and in some embodiments is, output at same time as the first and second emergency alert message content is output.

In step 738, one of the hubsite elements, e.g., control module 128 or switch 124, identifies from source mapping information to be used when an alert is in effect, which of a third plurality of outputs of the switching device are to be switched to a third emergency alert content source providing third emergency alert message content.

Step 738 may include accessing, in step 739, information, e.g., configuration/mapping information 130 stored in memory, indicating which of a plurality of content sources are to be replaced with the third emergency alert content source in the event of an emergency alert. The accessed information may be in the form of a table such as the one shown in FIG. 10 which may be generated and supplied to the hubsite by the EAS management server 104 or another device. A number 3 would be used in the last column 1006 of the table to indicate that a switch to the third emergency content should be made in the case of an alert if such a switch was to be made for a particular content source. In the exemplary embodiment the third emergency alert content corresponds to test content. Since FIG. 10 is to be representative of a table that might be used in the case of an actual emergency alert, the control value "3" does not appear in the last column of the table since it would be undesirable to output a test pattern during an actual alert.

Operation proceeds from step 738 to step 744. In step 744, the switch 124 switches, in response to the received first emergency alert control message, to output the third emergency alert message content on the identified first plurality of outputs. Operation proceeds from step 744 to step 750 wherein the third emergency alert message content is output by the switching device 124 onto a third frequency band for delivery to one or more customer premise devices. It should be appreciated that the third emergency alert message content will normally be output on other frequency bands as well, e.g., used prior to the alert to deliver other program channels, but a single frequency band is mentioned in step 750 for purposes of simplicity in explaining the invention. Operation proceeds from step 750 to step 754 via connecting node B 752.

Step 754 corresponds to the receipt at one or more components of the hubsite, e.g., at control module 128 or switch 124, of an emergency alert control message, e.g., a second alert control message, indicating that an emergency alert message is not in effect. Such a message represents a signal to the control module 128 and/or switch 124 that the hubsite is to operate in a normal content distribution mode of operation, e.g., distributing content corresponding to regular audio and video program channels rather then content corresponding to one or more emergency alert channels. In response to the second emergency alert message, operation proceeds to step 756, 758 and/or step 760.

In step 756 the switching device 124 is controlled to switch the first plurality of outputs back to outputting content from one or more content sources from which content was being received prior to the emergency alert going into effect. In step 758 the switching device 124 is controlled to switch the second plurality of outputs back to outputting content from one or more content sources from which content was being received prior to the emergency alert going into effect. In step 760 the switching device 124 is controlled to switch the third plurality of outputs back to outputting content from one or more content sources from which content was being received prior to the emergency alert going into effect.

Thus, with the completion of steps 756, 758 and/or 760, the hubsite will have been switched back into a normal content distribution mode of operation with channels which has been switched to emergency alert message content sources having been switched back to the original content sources to which they were coupled.

Note that the set top boxes need not retune in response to the described hubsite content source switching operations used to switch into the emergency alert message content distribution mode of operation or back to the normal content distribution mode of operation since the output frequencies used to supply content to the customer premise devices does not change as part of the switching operations. Note also that some of the channels, e.g., channels which incorporate emergency alert banners, are not switched at the hubsite, to a different content source in the case of an emergency alert. For example, channels listed in FIG. 10 with a "switch on EAS Alert" value of 0 indicated in the last column are unaffected by a change to an emergency alert message content distribution mode of operation at a hubsite to which the table of FIG. 10 relates.

Operation continues after steps 756, 758 and 760 with normal program content being distributed until another emergency alert message is received.

FIG. 8 illustrates an exemplary emergency alert message content source stream number configuration map in the form of a table. Some or all of the data and/or mapping information provided in the table may be, and in some embodiments of the present invention is, generated by the EAS Management Server 104 of FIG. 1. In some embodiments the map data and/or information is stored in memory at the headend and/or at the hubsite. In some embodiments, the emergency program map data and/or information is transmitted from the headend to the hubsite. In some embodiments of the present invention the emergency program confirmation map data and/or information is transmitted from the EAS Management Server in the headend to the hubsite (e.g., control module 128 of FIG. 2) and stored in the configuration information and/or tables 120 memory of hubsite 110 of FIG. 2 for use by the hubsite (e.g., control module 128) during switching of program content during an emergency alert. The exemplary emergency alert message content source stream number configuration map 800 is depicted as a table which provides a mapping for the various exemplary emergency alert content source stream numbers and their associated information including each emergency alert content stream number, and its corresponding EAS Definition, Multicast Source IP Address, if any, and Multicast Source Port Address, if any. In this example, there are four emergency alert message content stream numbers. The first un-numbered row in the table provides the headings for the data associated in each of the columns of the table. Row 1, the second row of the table from the top, depicts the information associated with an emergency alert message content stream number 0. Stream number 0 has an EAS Definition of "Do Not Switch On EAS Alert". As no alert is to be switched on for stream number 0 no multicast source IP address or multicast source port address is provided instead the mapping indicates that those fields are not applicable. The emergency alert message content stream number 1 is depicted in row 2, the third row from the top of the table. Stream number 1 has an EAS Definition of "Encoded EAS Program Stream". Program stream of stream 1 contains both audio and video content. The associated multicast source port address is shown in row 2 column 3 represented by XXX.XXX.XXX.XXX where X's are variable values that indicate a port address. For example, the X's can be replaced by numbers such as 123.123.123.123 or 143.234.432.234. The multicast source port address for stream number 1 is shown in row 2 column 4 as YYYY where Y depicts any variable. For example, Y may be 3231 or 1111. Stream number 2 is shown in row 3 which is the fourth row from the top of the table. The EAS Definition is "Encoded EAS Audio Stream for Music Choice" and it multicast source IP address and multicast source port address is shown in columns 3 and 4 respectively. X and Y are used as variables to represent the addresses. The stream number 3 is shown in row 4 the last row of table 800. Stream number 3 has an EAS Definition of Encoded Maintenance Slate and represents a test stream that may be used to test the functionality of the emergency alert service functionality. Its associated multicast source IP address and multicast source port address is shown in row 4 columns 3 and 4 respectively. Once again X and Y are used as variables to represent the addresses. In various embodiments of the invention the emergency alert message content streams 1, 2 and/or 3 are generated by the EAS Management Server 104.

Table 900 of FIG. 9 depicts an exemplary EAS Zone configuration hubsite map that maps the Federal Information Processing Standard (FIPS Code Area) to the corresponding QAM modulators supporting the identified area. The first un-numbered row provides information identifying the information contained in each column. Each numbered row identifies the federal information processing standard code area and the corresponding QAM modulators at the hubsite that distribute content to the customer premise devices, e.g., set tops, in the FIPS code area. For example row 912 is the first entry in the table it provides the information that QAM modulators 1 and 4 of the exemplary hubsite associated with this exemplary EAS Zone configuration hubsite map distributes content to customer premise devices, e.g., set top boxes, in the county of Autauga in the state of Alabama which has a FIPS area code of 01001. Some or all of the information in this map may be, and in some embodiments of the present invention is, stored in memory at the hubsite and/or headend. For example, the information in this map may be, and in some embodiments is, stored in memory 130 of hubsite 1 (110) of FIG. 2, and is accessible by control module 128 so that it can be used to control switch/router 124 to switch the appropriate emergency alert message content sources to the input of the appropriate QAMs corresponding to the affected FIPS area codes identified in the emergency alert service message provided by the federal EAS. In some exemplary embodiments, some or all of the information contained in exemplary EAS Zone configuration hubsite map 900 is stored in the memory within the EAS Management Server 104 or memory associated therewith. In some embodiments, the EAS Management Server 104 accesses the information in the memory map containing the FIPS to QAM mapping per hubsite information and generate emergency alert control messages for each affected hubsite and transmits over the CTRL link to the hubsite's control module 128 information and/or commands that direct which QAM modulators should be used in distributing the emergency alert message content. The EAS Management server makes the determination of which hubsite and QAM modulators within the hubsite are to be used based on the FIPS area code information provided in the Federal EAS alert message provided to the EAS Management System.

FIG. 10 is comprised of FIG. 10 A, FIG. 10 B, and FIG. 10C. Table 1000 of FIG. 10 is a exemplary channel map configuration for a particular exemplary hubsite that maps each channel with its corresponding regular content description, QAMs Control IP Address, Multicast Source IP Address, Multicast Source Port Address, and the emergency alert content stream number/identifier to switch that channel to upon an EAS Alert. Some or all of this information may be, and in some embodiments of the present invention, is stored in memory in the hubsite, e.g., memory 130 of FIGS. 2-5 so that it can be accessed by control module 128 when an emergency alert control message is received and switch over from regular programming source content is necessary. Some or all of the information contained in the map of table 1000 may be, and in some embodiments, is stored in the headend in memory in or associated with EAS Management Server 104. The un-numbered row at the top of table 1000 contains the description of the content in each associated column. Each of the numbered rows is a mapping of a channel and/or program with its corresponding regular content description (column 1004), QAMs Control IP Address (1006), Multicast Source IP Address (1008), Multicast Source Port Address (1010), and the emergency alert content stream number/identifier to switch that channel to upon an EAS Alert referred to as Switch On Alert EAS Alert (1012). For example, numbered row 1 ABC HD is the current program being provided on a specific channel, QAMSs Control IP Address is provided in row 1 column 1006, the multicast source IP address is provided in row 1 column 1008, the multicast source port address is located in column 1010. X's and Y's are used as variable to indicate that any number may be used in its place. Column 1012 of row 1 identifies the emergency alert content source stream number to switch upon activation of EAS alert operation. In this case the stream number is 0. The emergency alert content stream number configuration map 800 indicates that there is no source content stream to switch to for this channel upon activation of an EAS alert operation. Numbered row 8 of FIG. 10 A indicates that the Telemundo HD channel should be replaced with emergency alert content stream 1 of map 800 upon activation of an EAS alert operation. Upon deactivation of an EAS alert operation, the multicast source IP address 1008 of row 8 and multicast source port address of row 8 provide the source content address to switch back to. Numbered row 1 of FIG. 10 B indicates that the Hit List music choice channel is to be replaced with the encoded EAS Audio Stream for Music emergency alert message content stream numbered 2 identified in map 800. A plurality of entries for music choice channels is shown in FIG. 10B and is continued in FIG. 10C. Each hubsite will have its own channel map configuration table. The headend may contain individual or combined set of channel maps for each hubsite to which it is connected.

FIG. 11 is a drawing 1100 illustrating in greater detail a portion of the system 100 of FIG. 1 including a hubsite, e.g., hubsite 110 and various elements therein, in accordance with one embodiment. FIG. 11 shows various elements of the hubsite 110 and switching device/router 124 in more detail. As can be appreciated from the figure, reference number 168 shows the content streams from the headend 102 being fed as input to the switching device 124, reference number 170 shows the emergency alert message content streams from the EAS management server 104 as an input to the switching device 124, arrow with reference number 172 represents the alert control message from the EAS management server 104.

As illustrated, the switching device 124 includes, among other elements, an input interface 160 and an output interface 162, each including a plurality of ports, e.g., the input interface 160 includes a plurality of input ports to accept multiple signals and/or content streams and the output interface 162 includes a plurality of output ports to supply multiple content output streams from the switching device 124, e.g., as indicated in the figure using reference number 174.

In various embodiments the content streams 168 from various content suppliers, the one or more alert message content streams 170 from the EAS management server 104 is received via the input interface 160. In some embodiments the interface 160 is further configured to receive the emergency alert control message 172 indicating that an emergency alert is in effect. It should be appreciated that the emergency alert control message 172 may be, and in some embodiments is, received directly from the EAS management server 104 (as shown with dashed arrow) or the alert control message 172 may be passed on by the control module 128 which receives the alert control message 172 from the EAS management server 104 via the input/output (I/O) interface 180. The I/O interface 180 is further configured to receive, at the hubsite, source mapping information via a control communications channel, the control communications channel being a different communications channel from a content channel used to supply the first emergency alert message content.

The control module 128 in various embodiments performs the function of a switching control module, which controls the switch device 124 to perform switching operations for selectively output the one or more of the alert message content streams 170 on one or more identified output ports included in the output interface 162. FIG. 11 shows that the control module 128 includes an identification module 166. The identification module 166 is configured to identify, from source mapping information to be used when an alert is in effect, which of a first plurality of outputs are to be switched to a first emergency alert content source providing first emergency alert message content. In some embodiments the identification module 166 accesses information, e.g., configuration/mapping information 130 stored in memory, indicating which of a plurality of content sources are to be replaced with the first emergency alert content source in the event of an emergency alert. As discussed earlier, the accessed information may be in the form of a table such as the one shown in FIG. 10. In some embodiments the interface 160 receives the source mapping information prior to receiving the first emergency alert control message. In various embodiments the control module 128 control the switching device 124 to switch, in response to the received emergency alert control message 172, to output the first emergency alert message content on the identified first plurality of outputs, e.g., those identified by the identification module 166.

In various embodiments the identification module 166 is further configured to identify, from source mapping information to be used when an alert is in effect, which of a second plurality of outputs are to be switched to a second emergency alert content source providing second emergency alert message content. The identification module 166 may access stored information to determine which of the second plurality of content sources are to be replaced with the second emergency alert content source in the event of an emergency alert. In various embodiments the control module 128 is further configured to control the switching device 124 to switch, in response to the received emergency alert control message 172, to output the second emergency alert message content on the identified second plurality of outputs.

In various embodiments the identification module 166 is further configured to identify, from source mapping information to be used when an alert is in effect, which of a third plurality of outputs are to be switched to a third emergency alert content source providing test system content. The identification module 166 may access stored information to determine which of a plurality of content sources are to be replaced with the test system content source in the event of the emergency alert. In various embodiments the control module 128 is further configured to control the switching device 124 to switch, in response to the received emergency alert control message 172, to output the test system content on the identified third plurality of outputs. In some embodiments the first emergency alert message content source is an emergency alert audio stream source, the second emergency alert message content source includes audio and video content including emergency alerter message information.

Thus in various embodiments, the control module 128 controls the switching device to output the emergency alert message content and the output is supplied to the QAM modulator 126 which modulates the emergency alert message content and onto one or more frequency bands for delivery to one or more customer premise devices.

In various embodiments the input interface is further configured to receive a second emergency alert control message, e.g., EAS alert termination message, instructing that the emergency alert is not in effect. In various embodiments the control module 128 is further configured to control the switching device to switch, in response to the received second emergency alert control message, the plurality of outputs, e.g., the first, second and third plurality of outputs, back to outputting content from one or more content sources from which content was being output prior to the alert being in effect. Thus the control module 128 controls the switching device 124 to switch the plurality of outputs back to output normal regular content which was being output before the emergency alert took effect.

While the switching device 124 is controlled to output emergency alert message content stream in place of the normal program content when the emergency alert in effect, it should be appreciated that in various embodiments, the connections from the switch device 124 to the QAM modulator 126 remains unchanged/unaffected. Set top box devices at various customer premises will receive the EAS message content without having to retune.

The system in accordance with various embodiments of the invention can be far cheaper to implement than an overlay system which would require combining (decoding and recoding) of the alert message with an MPEG video stream on a per channel basis.

The methods in accordance with various embodiments are well suited for various devices including non-set top box devices where control of the customer equipment (computer) may not be easy to achieve for EAS message insertion/display purposes. In many, if not all embodiments, the proposed method is transparent to the end devices which simply display the content stream they receive on a particular channel.

In various embodiments system elements described herein are implemented using one or more modules which are used to perform the steps corresponding to one or more methods of the present invention, for example, storing information; receiving a request for video service information; and providing at least some video service information, in response to the request for video service information. In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method for providing emergency alert messages, comprising:
receiving, at a network switching device located at a hub site, coupled to a plurality of customer premise devices, a first emergency alert control message indicating that an emergency alert is in effect;
accessing, at said hub site a program channel map table, said program channel map table including for each of a first plurality of individual program channels corresponding emergency alert content stream identification information, emergency alert content stream identification information corresponding to an individual program channel in the first plurality of program channels indicating an emergency alert content stream to be output in place of the corresponding individual program channel content when an emergency alert is in effect; and switching, on a per program channel basis, at said network switching device, when the emergency alert is in effect, from outputting program content to customer premise devices on the program channel being switched, to outputting on the program channel being switched, emergency alert message content communicated by the emergency alert content stream indicated by said program channel map table to correspond to the individual program channel being switched, said switching including switching each of the first plurality of individual program channels.

2. The method of claim 1, wherein said program channel map table includes, for each of a second plurality of individual program channels, information indicating that a switch to an emergency alert stream is not to be made when the emergency alert is in effect; and wherein said first emergency alert control message is received from an emergency alert server.

3. The method of claim 1, wherein the method further comprises delivering the emergency alert message content to a customer premise device on one of said first plurality of program channels using the same frequency and modulation technique which was previously being used to deliver program content on said one of said first plurality of program channels.

4. The method of claim 3, further comprising:

receiving said program channel map table prior to an emergency alert going into effect; and storing the program channel map table in memory at said hub distribution site, said table including information identifying program channels and corresponding emergency alert message source information in addition to descriptions of program channels listed in said program channel map table and corresponding multicast source IP addresses indicating multicast addresses used to supply regular program content.

5. The method of claim 1, wherein said network switching device does not output program content, from said one or more content sources used to provide regular program content, on a first plurality of outputs when outputting said emergency alert message content on said first plurality of outputs.

6. The method of claim 1, further comprising:

receiving, at the network switching device, a second emergency alert control message instructing that said emergency alert is not in effect; and switching, in response to the received second emergency alert control message, said first plurality of program channels back to outputting program content from one or more content sources from which content was being output prior to said alert being in effect.

7. The method of claim 1, further comprising:

receiving at said hub site said program channel map table from an emergency alert server prior to receiving said first emergency alert control message; and wherein the method further comprises operating the emergency alert server to generate and send said first emergency alert control message to said hub site after said program channel map table is stored in said hub site.

8. The method of claim 7, wherein said emergency alert content stream to be output in place of the corresponding individual program channel is an emergency alert audio content stream.

9. The method of claim 7, further comprising:

identifying from said program channel map table which of a second plurality of program channels are to be switched to a second emergency alert content source providing second emergency alert message content; and switching, in response to the received first emergency alert control message, to outputting said second emergency alert message content on the identified second plurality of program channels.

10. The method of claim 9, wherein said second emergency content includes audio and video content including emergency alert message information.

11. The method of claim 9, the method further comprising:

switching, in response to the received first emergency alert control message, to outputting test information on a third plurality of program channels.

12. The method of claim 1, wherein said network switching device supplies content to a single Federal Information Processing Standard (FIPS) region, the method further comprising:

receiving said source mapping information prior to receiving said first emergency alert control message.

13. The method of claim 1, further comprising:

receiving, at the hubsite including said network switching device, said program channel map table via a control communications channel, said control communications channel being a different communications channel from a content channel used to supply said emergency alert content stream.

14. The method of claim 1, further comprising:

operating an emergency alert server to perform the steps of:
receiving a first emergency alert message;
generating first emergency alert message content based on at least some information included in said first emergency alert message; and
transmitting said first emergency alert message content to said network switching device via an emergency alert content stream identified in said program channel map table.

15. The method of claim 14, wherein said emergency alert content stream includes audio content.

16. The method of claim 14, wherein said emergency alert content stream includes video content.

17. A system for providing emergency alert messages, comprising:

a network switching device located at a hub site, the network switching device including an interface configured to receive a first emergency alert control message indicating that an emergency alert is in effect;

an identification module configured to access, at said hub site a program channel map table, said program channel map table including for each of a first plurality of individual program channels corresponding emergency alert content stream identification information, emergency alert content stream identification information corresponding to an individual program channel in the first plurality of program channels indicating an emergency alert content stream to be output in place of the corresponding individual program channel content when an emergency alert is in effect; and a switching control module configured to control said network switching device, to switch, on a per program channel basis, at said network switching device, when the emergency alert is in effect, from outputting program content to customer premise devices on the program channel being switched, to outputting on the program channel being switched, emergency alert message content communicated by the emergency alert content stream indicated by said program channel map table to correspond to the individual program channel being switched, said switching including switching each of the first plurality of individual program channels.

18. The system of claim 17, further comprising:
a QAM modulator device configured to modulate the emergency alert message content output by said network switching device onto a first frequency band for delivery to one or more customer premise devices on at least one program channel used to supply content prior to said switch being controlled to switch from outputting program content to outputting said emergency alert message content.

19. The system of claim 17,
wherein said network switching device does not output program content on program channels which have been switched to outputting said emergency alert message content while an emergency alert is in effect.

20. A non-transitory computer readable medium for use in a system for providing emergency alert messages, said non-transitory computer readable medium comprising instructions which when executed by a processor control a network switching device located at a hub site, coupled to a plurality of customer premise devices, to:

receive, at said network switching device, a first emergency alert control message indicating that an emergency alert is in effect;

access, at said hub site a program channel map table, said program channel map table including for each of a first plurality of individual program channels corresponding emergency alert content stream identification information, emergency alert content stream identification information corresponding to an individual program channel in the first plurality of program channels indicating an emergency alert content stream to be output in place of the corresponding individual program channel content when an emergency alert is in effect; and switch, on a per program channel basis at said network switching device, when the emergency alert is in effect, from outputting program content to customer premise devices on the program channel being switched, to outputting on the program channel being switched, emergency alert message content communicated by the emergency alert content stream indicated by said program channel map table to correspond to the individual program channel being switched, said switching including switching each of the first plurality of individual program channels.

* * * * *